(12) United States Patent
Liao

(10) Patent No.: US 11,301,203 B2
(45) Date of Patent: Apr. 12, 2022

(54) MULTIMEDIA PLAYING CONTROL METHOD AND APPARATUS, TERMINAL, AND STORAGE MEDIUM

(71) Applicant: TENCENT TECHNOLOGY (SHENZHEN) COMPANY LTD, Guangdong (CN)

(72) Inventor: Zhang Liao, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 16/997,354

(22) Filed: Aug. 19, 2020

(65) Prior Publication Data

US 2020/0379721 A1 Dec. 3, 2020

Related U.S. Application Data

(63) Continuation of application No. PCT/CN2019/094640, filed on Jul. 4, 2019.

(30) Foreign Application Priority Data

Jul. 17, 2018 (CN) .......................... 201810795502.6

(51) Int. Cl.
*G06F 3/16* (2006.01)
*G06F 9/451* (2018.01)
*G06F 3/0484* (2022.01)

(52) U.S. Cl.
CPC ............ *G06F 3/165* (2013.01); *G06F 3/0484* (2013.01); *G06F 9/451* (2018.02)

(58) Field of Classification Search
CPC .. G06F 3/0482; G06F 3/0484; G06F 3/04886; G06F 3/165; G06F 8/38; G06F 9/451; H04N 21/47217
See application file for complete search history.

(56) References Cited

U.S. PATENT DOCUMENTS

2008/0250319 A1* 10/2008 Lee .................. G06F 9/451
  715/716
2015/0040009 A1* 2/2015 Curry .................. G06F 3/017
  715/719

(Continued)

FOREIGN PATENT DOCUMENTS

CN 103324403 A 9/2013
CN 103763587 A 4/2014

(Continued)

OTHER PUBLICATIONS

Written Opinion of the International Searching Authority dated Sep. 26, 2019, in Application No. PCT/CN2019/094640.

(Continued)

*Primary Examiner* — Tan H Tran
(74) *Attorney, Agent, or Firm* — Sughrue Mion, PLLC

(57) ABSTRACT

A method of controlling playing of multimedia is provided. The method includes obtaining, by a terminal, a first resource list of a first user interface (UI), the first resource list including one or more pieces of multimedia; obtaining, by the terminal based on detection of a trigger operation on first multimedia in the first UI, a resource type of the first multimedia; determining, by the terminal, a second resource list of a second UI based on the resource type of the first multimedia, the second resource list including at least the first multimedia; and switching, by the terminal, the first UI to the second UI based on the second resource list, and playing resource content of the first multimedia in the second UI.

20 Claims, 12 Drawing Sheets

(56) References Cited

U.S. PATENT DOCUMENTS

| | | | |
|---|---|---|---|
| 2015/0113407 A1* | 4/2015 | Hoffert | G06F 16/743 |
| | | | 715/720 |
| 2016/0334973 A1* | 11/2016 | Reckhow | H04N 21/472 |
| 2016/0335049 A1* | 11/2016 | Persson | G06F 3/165 |
| 2016/0358631 A1* | 12/2016 | Lee | G06F 1/163 |
| 2017/0046023 A1 | 2/2017 | Kumar et al. | |
| 2017/0109008 A1* | 4/2017 | Darby | G06F 3/03545 |
| 2019/0200051 A1* | 6/2019 | Paul | H04N 21/812 |

FOREIGN PATENT DOCUMENTS

| | | |
|---|---|---|
| CN | 104965693 A | 10/2015 |
| CN | 105739886 A | 7/2016 |
| CN | 108027701 A | 5/2018 |
| CN | 108093290 A | 5/2018 |
| CN | 109032738 A | 12/2018 |

OTHER PUBLICATIONS

International Search Report for PCT/CN2019/094640 dated Sep. 26, 2019 (PCT/ISA/210).

\* cited by examiner

MULTIMEDIA PLAYING CONTROL METHOD AND APPARATUS, TERMINAL, AND STORAGE MEDIUM

CROSS-REFERENCE TO RELATED APPLICATION(S)

This application is a bypass continuation application of International Application No. PCT/CN2019/094640, filed Jul. 4, 2019, which claims priority to Chinese Patent Application No. 201810795502.6, entitled "MULTIMEDIA PLAYING CONTROL METHOD AND APPARATUS, TERMINAL, AND STORAGE MEDIUM" and filed with the China National Intellectual Property Administration on Jul. 17, 2018, the disclosures of which are herein incorporated by reference in their entireties.

FIELD

The disclosure relates to the field of Internet technologies, specifically to the field of multimedia technologies, and in particular, to multimedia playing control.

BACKGROUND

With the popularization of the Internet and the reduction of costs of using terminal devices (such as mobile phones or portable Android devices (PADs)), a quantity of terminal device users is increasing, and users' choices and demands for multimedia are becoming more diversified. Providing diversified multimedia data is an important factor in multimedia applications (APPs) in terminal devices to ensure users' satisfaction and enhance user stickiness.

Among the multimedia APPs, short video APPs are very popular, and the short video APPs are mainly based on the following principle: A terminal on which the APP is located pulls a plurality of pieces of video data from a server and displays the video data in a user interface (UI) of the APP. A user can slide up and down in the UI to play each video data in the UI in sequence.

SUMMARY

One or more example embodiments of the disclosure provide a multimedia playing control method and apparatus, a terminal, and a storage medium, to provide diversified user interfaces (UIs), and support UI switching in a multimedia playing process.

According to an aspect of an example embodiment, provided is a method of controlling playing of multimedia, the method including:

obtaining, by a terminal, a first resource list of a first user interface (UI), the first resource list comprising one or more pieces of multimedia;

obtaining, by the terminal based on detection of a trigger operation on first multimedia in the first UI, a resource type of the first multimedia;

determining, by the terminal, a second resource list of a second UI based on the resource type of the first multimedia, the second resource list comprising at least the first multimedia; and switching, by the terminal, the first UI to the second UI based on the second resource list, and playing resource content of the first multimedia in the second UI.

According to an aspect of an example embodiment, provided is an apparatus for controlling playing of multimedia, the apparatus including: at least one memory configured to store program code; and at least one processor configured to read the program code and operate as instructed by the program code, the program code including:

first obtaining code configured to cause at least one of the at least one processor to obtain a first resource list of a first user interface (UI) currently displayed on a terminal, the first resource list including one or more pieces of multimedia;

second obtaining code configured to cause at least one of the at least one processor to obtain, based on detection of a trigger operation on first multimedia in the first UI, a resource type of the first multimedia;

first determining code configured to cause at least one of the at least one processor to determine a second resource list of a second UI based on the resource type of the first multimedia, the second resource list including at least the first multimedia; and playing code configured to cause at least one of the at least one processor to switch from the first UI to the second UI based on the second resource list, and play resource content of the first multimedia in the second UI.

According to an aspect of an example embodiment, provided is a terminal for controlling playing of multimedia, the terminal including an input interface configured to receive a user input and an output interface to output the multimedia, the terminal further including:

a computer readable storage medium, storing one or more instructions; and at least one processor configured to execute the one or more instructions to perform:

obtaining a first resource list of a first user interface (UI), the first resource list comprising one or more pieces of multimedia;

obtaining, based on detection of a trigger operation on first multimedia in the first UI, a resource type of the first multimedia;

determining a second resource list of a second UI based on the resource type of the first multimedia, the second resource list comprising at least the first multimedia; and switching the first UI to the second UI based on the second resource list, and playing resource content of the first multimedia in the second UI.

According to an aspect of an example embodiment, provided is a non-transitory computer readable storage medium, storing one or more instructions, the one or more instructions being suitable for being loaded by a processor to perform:

obtaining, by a terminal, a first resource list of a first user interface (UI), the first resource list including one or more pieces of multimedia;

obtaining, by the terminal based on detection of a trigger operation on first multimedia in the first UI, a resource type of the first multimedia;

determining, by the terminal, a second resource list of a second UI based on the resource type of the first multimedia, the second resource list comprising at least the first multimedia; and switching, by the terminal, the first UI to the second UI based on the second resource list, and playing resource content of the first multimedia in the second UI.

BRIEF DESCRIPTION OF THE DRAWINGS

To describe the technical solutions in the embodiments of the disclosure more clearly, the following briefly introduces the accompanying drawings required for describing the embodiments. Apparently, the accompanying drawings in the following description show only some embodiments of the disclosure, and a person of ordinary skill in the art may still derive other embodiments and/or drawings from these accompanying drawings without creative efforts.

DETAILED DESCRIPTION

Figure 1:
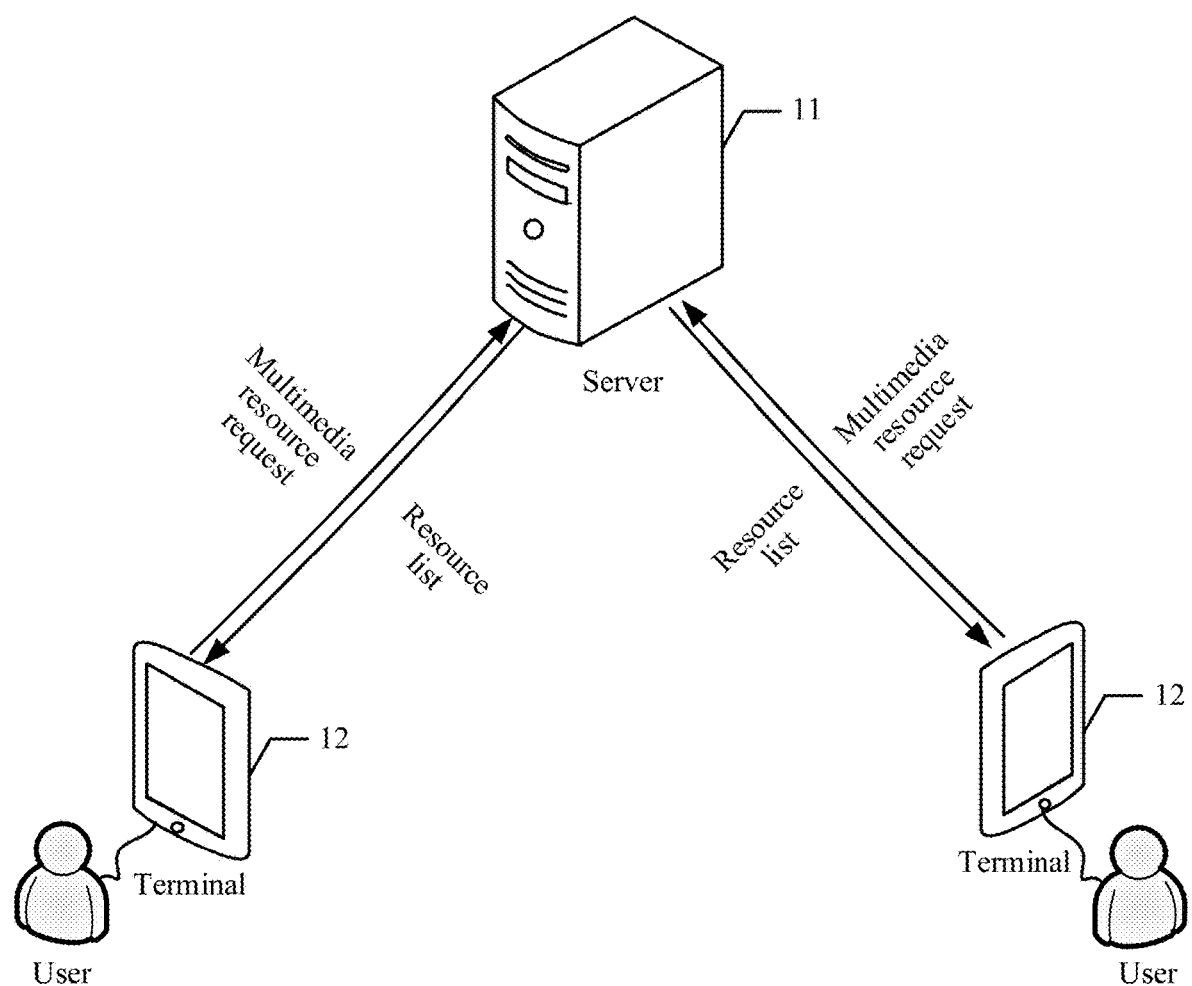
FIG. 1 is a schematic structural diagram of a multimedia playing control system according to an embodiment of the disclosure.

The following clearly and completely describes the technical solutions in the embodiments of the disclosure with reference to the accompanying drawings in the embodiments of the disclosure.

Multimedia refers to a combination of various media that may include various media forms such as text, images, audio, and videos. In a playing control process of multimedia, a playing preview manner of the multimedia greatly determines favorability of a user for a client (that is, an application (APP)) playing the multimedia. Practice has shown that users' favorability for a client may be improved in the following two manners.

1. Diversified User Interface (UI) Styles

Exposing diversified multimedia posters to attract users through operation means is a basic approach to increase users' favorability for multimedia APPs. This manner mainly means that within a period of time, such as during holidays and special times (for example, the World Cup), styles of the multimedia APPs may be redesigned, or a new UI style may be added to the existing UI, or a display order and a display form of elements in the UI may be adjusted, or the like. Common UI styles may include, but are not limited to: a nine-block-box style, a double waterfall flow style, a watermelon flow style, a personal center list style, and the like.

2. Diversified Pre-Playing Functions

Pushing more interesting multimedia or multimedia that users are interested in to the users to guide the users to click the pushed multimedia for pre-playing while ensuring good multimedia playing experience of the users may greatly increase user stickiness. The user stickiness may be used for representing a quantity of times that a user uses a multimedia APP. The pre-playing function herein may include the following three points: (1) The multimedia APP switches to a pre-playing interface after detecting a click instruction on the multimedia, for example, switches to a pre-playing interface of an audio after detecting a click instruction on the audio; in another example, switches to a preview interface of a video after detecting a click instruction on the video. (2) The user may watch and switch the multimedia in the pre-playing interface, for example, in a preview interface of a video, the user may play the video while browsing other videos in the preview interface through operations of sliding up and pulling down, and when clicking another video, stop playing the current video and play the another clicked video in the preview interface. (3) Clicking the multimedia to enter the pre-playing interface and/or exit the pre-playing interface each has a transition animation, and the transition animation is an animation displayed in an interface switching process, and may be an animation displayed during entering the pre-playing interface or exiting the pre-playing interface herein.

Further, if pre-playing content triggered by the user may be dynamically adjusted with reference to a pre-playing scenario based on an analysis of playing habits of the user, to provide the multimedia that is of interest for the user to view and play, the user experience may further be enhanced, and the user stickiness may further be improved. The pre-playing scenario herein may include, but is not limited to the following scenarios: (1) A pre-playing operation only aims to a single piece of multimedia. (2) A resource list is pre-played, for example, a multimedia portfolio posted by a person is viewed and played. (3) After the pre-playing is entered, the current multimedia is pre-played, and then more related recommended multimedia are viewed through sliding up and down. (4) After the pre-playing is entered, some multimedia in a resource list are pre-played, and the UI is pulled up and down to load more multimedia. When the pre-playing is exited, a playing and viewing sequence of the user is not interrupted, to ensure data synchronization. For example, when the user views a multimedia portfolio of a person, clicks the multimedia to enter a pre-playing interface, views a plurality of pieces of multimedia in the pre-playing interface, and then returns to the displaying interface of the multimedia portfolio, the resource list remains consistent with the resource list during the pre-playing. (5) When a previous interface is entered again (that is, an interface before the pre-playing interface is entered) after the pre-playing is over, positioning of the currently pre-played multimedia in the previous interface is supported, and when the user views the previous interface, the user may be guided to know the previous pre-played multimedia.

In view of this, the embodiments of the disclosure provide a multimedia playing control system. Referring to FIG. 1, the system may include a server 11 and at least one terminal 12.

A multimedia APP may be installed and run on the terminal 12. The terminal 12 herein may include, but is not limited to: portable devices such as a mobile phone, a laptop computer or a tablet computer, a desktop computer, and other devices on which a multimedia APP is installed. The server 11 may be a service device configured to provide a multimedia playing service, which may be a data processing server, a web server, an application server corresponding to the multimedia APP, or the like. In an actual application, the server 11 may be an independent service device, or may be a cluster device including a plurality of service devices. A working principle of the system is as follows:

First, when a user wants to play a multimedia, the user may click a multimedia APP in the terminal 12. After detecting the click operation on the multimedia APP, the terminal 12 starts the multimedia APP, and requests to the server 11 to obtain a multimedia resource list corresponding to each UI of the multimedia APP. After the server 11 delivers the multimedia resource lists to the terminal 12, the terminal 12 may store the multimedia resource lists corresponding to the UIs into a local storage space; and obtains a first resource list of a first UI currently displayed from the local storage space according to the first UI. The first UI may display a plurality of pieces of multimedia, for example, text, images, audio, and videos. The first UI herein may be any UI of the multimedia APP.

Next, the user may select first multimedia that the user is interested in in the first UI. If the terminal 12 detects a trigger operation of the user on the first multimedia in the first UI, the terminal 12 may obtain a resource type of the first multimedia. The trigger operation herein refers to an operation used for triggering the UI to switch. For example, the trigger operation may be a click-to-play operation performed by the user on audio, and may be used for triggering switching from the first UI to a pre-playing interface of the audio. Alternatively, the trigger operation may be a click-to-preview operation performed by the user on a video, and may be used for triggering switching from the first UI to a preview interface of the video. The purpose herein is to determine the resource type of the operated first multimedia. For example, if the user performs the trigger operation on a piece of audio, the resource type of the first multimedia is audio. If the user performs the trigger operation on a video, the resource type of the first multimedia is video. The terminal 12 determines a second resource list of a second UI according to the resource type of the first multimedia, the second resource list including at least the first multimedia. The second UI may be a pre-playing interface of the first multimedia. The second UI may further include other multimedia in addition to the first multimedia. The other multimedia herein may be multimedia extracted from the first UI. Specifically, the terminal 12 may obtain multimedia of the same type from the first resource list corresponding to the first UI according to the resource type of the first multimedia, to form the second resource list. The second resource list may alternatively be recommended multimedia obtained according to information about the user, such as, for example, hobbies and interests of the user. Therefore, contents of the second UI are more sufficient, flexible, and diversified, and may better meet actual requirements of the user. Specifically, the terminal 12 may request to the server 11 to obtain the second resource list corresponding to the second UI according to the resource type of the first multimedia. The server 11 may determine third multimedia to be recommended according to the resource type of the first multimedia, and deliver the third multimedia to the terminal 12. After receiving the third multimedia, the terminal 12 may add the third multimedia to the second resource list. After determining the second resource list, the terminal 12 may display the second UI according to the second resource list.

Finally, the terminal 12 may display the second UI based on the second resource list, that is, switch from the first UI to the second UI, and play the resource content of the first multimedia in the second UI. Further, a transition animation playing function in the interface switching process may be further supported, and a function of browsing while playing may be further supported in the process of playing the resource content of the first multimedia in the second UI, so that the intelligence of a multimedia playing control process is effectively improved through each optimization function, thereby improving favorability of users for a client.

The multimedia playing control method solution provided in the embodiments of the disclosure has the following advantages: (1) Playing control on diversified multimedia data such as audio, videos, text, and images may be implemented, and different resource types may correspond to different UI styles, thereby enriching the UI styles. (2) Switching of the UI interface may be implemented through a trigger operation on any multimedia in the first UI, thereby increasing the flexibility and diversity of the multimedia playing interface, enriching UI display effects, and improving the operating capability. (3) Because the first multimedia is selected by the user, and the second resource list is determined according to the resource type of the first multimedia, the multimedia in the second resource list may better meet the actual playing requirements of the user, thereby improving the flexibility and intelligence of the multimedia playing control, and improving the product competitiveness and user stickiness. (4) A transition animation function in a multimedia playing control process is further supported, thereby making the multimedia playing process more interesting. In addition, the function of browsing while playing is further supported, thereby decoupling the UI interface from the multimedia playing, and improving the intelligence and interactivity of the multimedia playing control.

Figure 2:
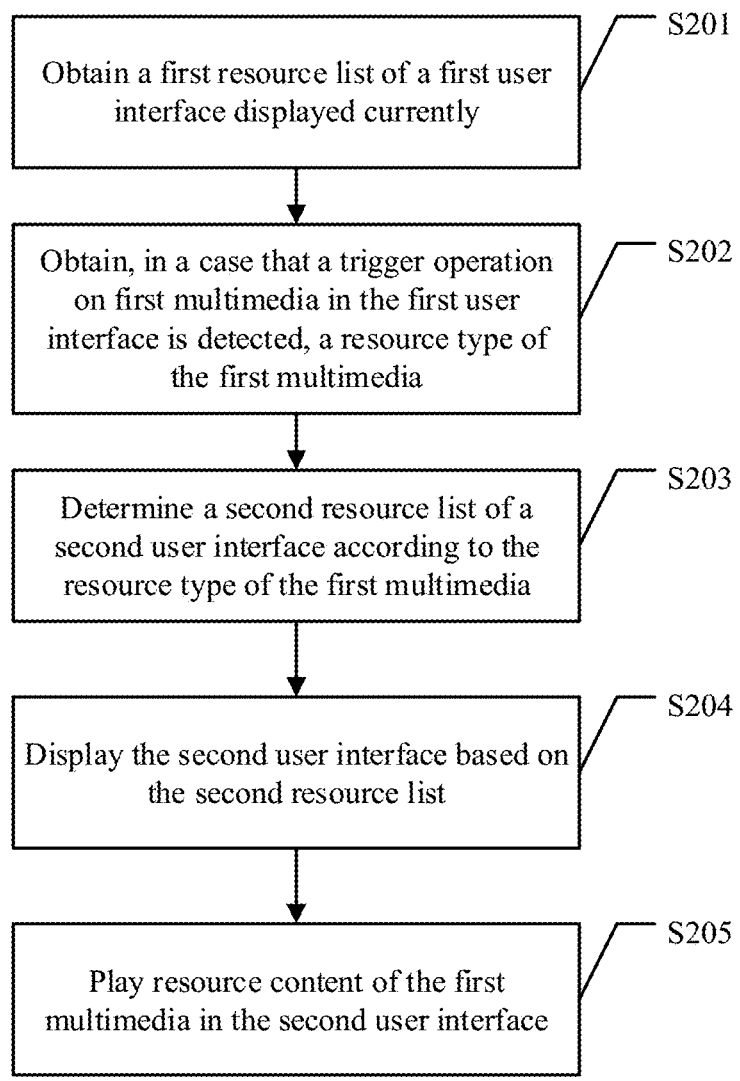
FIG. 2 is a schematic flowchart of a multimedia playing control method according to an embodiment of the disclosure.

Based on the foregoing description, an embodiment of the disclosure provides a multimedia playing control method. Referring to FIG. 2, the multimedia playing control method may be performed by any terminal shown in FIG. 1. As shown in FIG. 2, the multimedia playing control method may include the following operations S201 to S205.

S201. Obtain a first resource list of a first UI currently displayed, the first resource list including one or more pieces of multimedia.

A UI, which may also be referred to as an interface of a user, is a medium for interaction and information exchange between a terminal and a user. One UI may correspond to one data model, and the data model may be configured to carry a resource list of a corresponding UI. The UI may be implemented in a manner of code, or may be implemented in a manner of a control. For example, the UI may be implemented through an ONAview control (a control developed by Tencent that can implement an interface). The ONAview control can support various service interfaces, and support flexible control of UI styles in the backend, that is, UI elements may be added, deleted, and reordered without front-end modification, and the like. The reusability of the UI is improved and code duplication and maintenance costs are reduced through the ONAView control. Based on this, subsequent embodiments of the disclosure are all illustrated by using an example in which the UI is implemented by the ONAView control. Specifically, one UI corresponds to one ONAView control. However, this is merely an example and the disclosure is not limited thereto (that is, the disclosure is not limited to the UI implemented by the ONAview control).

In the embodiments of the disclosure, a multimedia APP may be installed and run on the terminal. The first UI may be any multimedia exposure entry interface of the multimedia APP. The multimedia exposure entry interface may include, but is not limited to: a main interface, a multimedia recommendation interface, a display interface of a multimedia portfolio, a personal homepage interface, a display interface of a collection portfolio, and the like. In operation S201, after the multimedia APP is started, the terminal obtains a resource list of each multimedia exposure entry interface from the server and stores the resource lists into the local storage space of the terminal, so that the first resource list of the first UI may be directly obtained from the local storage space of the terminal according to operation S201. The first resource list may include one or more pieces of multimedia, and a resource type of the multimedia may include one or more of the following: text, audio, videos, images, and the like. After obtaining the first resource list, the terminal may determine a layout of the first UI in advance according to the first resource list, and display the first UI according to the layout of the first UI. Determining the layout in advance may avoid time consumption that would otherwise be caused by determining the layout and rendering of the first UI during the display process, and the contents of the first UI may be displayed to the user quickly and timely. According to operating requirements, the UI styles of the first UI may include, but are not limited to: a nine-block-box style, a double waterfall flow style, a watermelon flow style, a full-screen card style, a personal center list style, and the like.

The layout of the first UI includes a display sequence and a display location of each multimedia in the first resource list in the first UI. For example, it is assumed that the first resource list is shown as the following table 1:

TABLE 1

First resource list

| Sequence number | Multimedia identifier | Resource type |
| --- | --- | --- |
| 1 | Aa | Video |
| 2 | Bb | Text |
| 3 | Cc | Music |
| 4 | Dd | Video |
| 5 | Ee | Video |
| 6 | Ff | Text |
| 7 | Gg | Video |
| ... | ... | ... |

Figure 3:
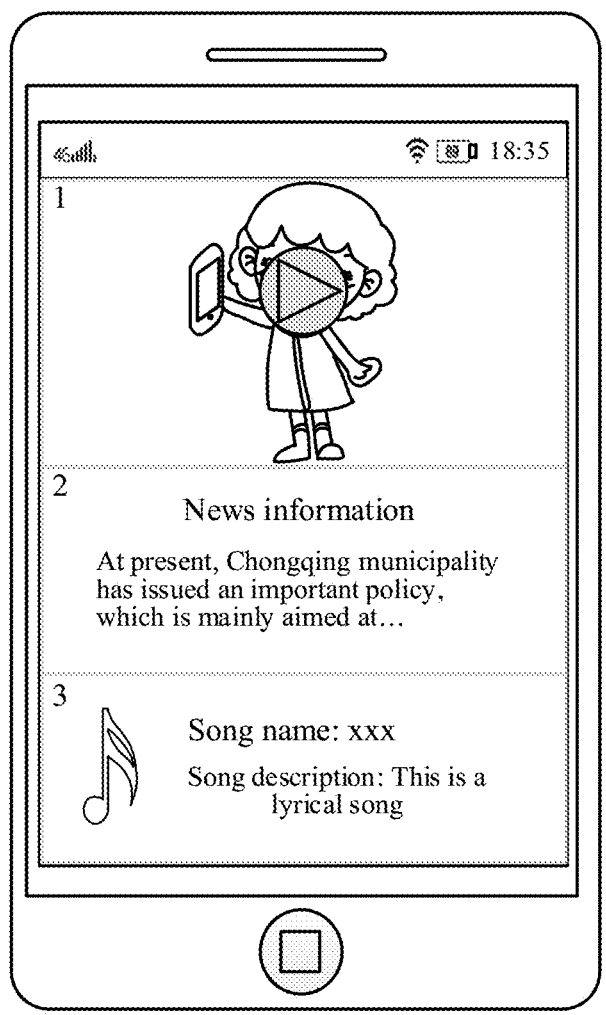
FIG. 3 is a schematic diagram of a first user interface (UI) according to an embodiment of the disclosure.

The sequence number in the foregoing table 1 is used for representing a display sequence of the multimedia in the first UI. For example, the sequence number 1 of the multimedia Aa represents that the multimedia Aa is the first multimedia displayed in the first UI. Referring to a layout of the first UI shown in FIG. 3, the display location of the first multimedia in the first UI is at the top of the first UI.

S202. Obtain, in a case that a trigger operation on first multimedia in the first UI is detected, a resource type of the first multimedia.

The user may select first multimedia that user is interested in from the multimedia displayed in the first UI, and performs a trigger operation on the first multimedia. The trigger operation herein refers to an operation used for triggering the UI to switch. For example, the trigger operation may be a click-to-play operation performed by the user on an audio in the first UI, and may be used for triggering switching from the first UI to a pre-playing interface of the audio. Alternatively, the trigger operation may be a click-to-preview operation performed by the user on a video in the first UI, and may be used for triggering switching from the first UI to a preview interface of the video. In an implementation, the trigger operation may include a click operation, a press operation, a sliding operation, or a voice operation. For example, the user may click or press the first multimedia in the first UI; or may perform a sliding operation on a display location corresponding to the first multimedia in the first UI, where the sliding operation may include a left-sliding operation (e.g., sliding in a left direction on the first UI) or a right-sliding operation (e.g., sliding in a right direction on the first UI); or may input a voice instruction when the terminal displays the first UI, for example, "please open a pre-playing interface of the first multimedia." If the trigger operation on the first multimedia in the first UI is detected, it indicates that the first multimedia is the multimedia that the user is interested in and wants to pre-play. In this case, the resource type of the first multimedia is obtained to determine a resource type of the multimedia that the user is interested in.

S203. Determine a second resource list of a second UI according to the resource type of the first multimedia, the second resource list including at least the first multimedia.

The second UI refers to an interface displayed after the first UI performs interface switching according to the trigger operation on the first multimedia. The second UI may be a pre-playing interface of the first multimedia. For example, if the first multimedia is audio, the second UI may be a pre-playing interface of the audio. Alternatively, if the first multimedia is a video, the second UI may be a preview interface of the video. In another example, if the first multimedia is text or an image, the second UI may be a preview interface of the text or the image. Because the first multimedia may be a multimedia that the user is interested in and that is selected by the user in the first UI, the resource type of the first multimedia may represent the interests and/or hobbies of the user to some extent. For example, if the resource type of the first multimedia is audio, it represents that the user is interested in playing audio, and in operation S203, audio data may be added to the second resource list to play for the user. If the resource type of the first multimedia is a video, it represents that the user is interested in playing a video, and in operation S203, video data may be added to the second resource list to play for the user. The second resource list herein includes one or more pieces of multimedia, and the second resource list includes at least the first multimedia.

Operation S203 may include the following implementations. In one implementation, other multimedia of the same resource type as the first multimedia may be sifted out (or selected) from the first resource list and added to the second resource list. For example, if the first multimedia is audio, some or all of audio data in the first resource list is sifted out and added to the second resource list. Alternatively, if the first multimedia is a video, some or all of video data in the first resource list may be sifted out and added to the second resource list. In this implementation, because all the multimedia in the second resource list are from the first resource list, to better implement the multimedia playing control, properties of all the multimedia in the second resource list remain consistent with properties of the multimedia in the first resource list. For example, the first multimedia is multimedia with a sequence number of 1 in the second resource list, and multimedia with a sequence number of 2 in the second resource list is to be multimedia that is located after the first multimedia, closest to the first multimedia, and of the same resource type as the first multimedia in the first resource list. For example, referring to the foregoing table 1, it is assumed that the first multimedia is a video with a sequence number of 4 and a multimedia identifier of Dd in the first resource list. Because the second UI is the preview interface of the first multimedia, the sequence number of the first multimedia in the second resource list is 1, that is, the first multimedia is multimedia displayed first in the second UI. Referring to the foregoing table 1 again, the multimedia that is located after the first multimedia, closest to the first multimedia, and of the same resource type as the first multimedia is a video with a sequence number of 5 and a multimedia identifier of Ee. In this case, a sequence number of the video with the multimedia identifier of Ee in the second resource list is 2, that is, the video is a video displayed after the video with the multimedia identifier of Dd in the second UI.

In another implementation, according to an operation strategy, the second resource list may include recommended multimedia related to the resource type of the first multimedia. For example, if the first multimedia is a video, some recommended videos may be sifted out from the Internet or a database according to the operation strategy and added to the second resource list. Further, after the resource type of the first multimedia is determined, the second resource list may be further determined according to the resource type of the first multimedia. The resource type herein may be a category type of the multimedia and may include, for example, a comedy type, an art type, a romantic type, or an animation type. For example, if the first multimedia is a comedy video, some recommended comedy videos may be sifted out from the Internet or a database according to the operation strategy and added to the second resource list. In this implementation, other multimedia in the second resource list than the first multimedia are from the Internet or a database. Therefore, to better implement the multimedia playing control and multimedia recommendation, sequence numbers of multimedia in the second resource list may be set according to actual requirements. For example, if the second UI is a preview interface of the first multimedia, a sequence number of the first multimedia in the second resource list is 1, that is, the first multimedia is multimedia displayed first in the second UI. Sequence numbers of other multimedia in the second resource list may be set randomly, or based on correlations with the first multimedia, or according to other principles. In this way, the display sequence of each multimedia in the second UI is determined.

As can be learned from the foregoing description, interest preferences of the user may be determined according to the resource type of the first multimedia on which the user performs the trigger operation, then the second resource list is determined accordingly, that is, the second resource list includes the multimedia that the user is interested in, and the second UI displayed based on the second resource list may provide the multimedia that the user is interested in for the user to view and play, thereby improving the multimedia playing experience of the user and improving user stickiness. In the embodiments of the disclosure, the second resource list is shown as the following table 2:

TABLE 2

| Second resource list | | |
|---|---|---|
| Sequence number | Multimedia identifier | Resource type |
| 1 | Dd | Video |
| 2 | Ee | Video |
| 3 | Gg | Video |
| ... | ... | Video |

S204. Display the second UI based on the second resource list.

S205. Play resource content of the first multimedia in the second UI.

Figure 4A:
FIG. 4a is a diagram of an application scenario of a second UI according to an embodiment of the disclosure.
Figure 4B:
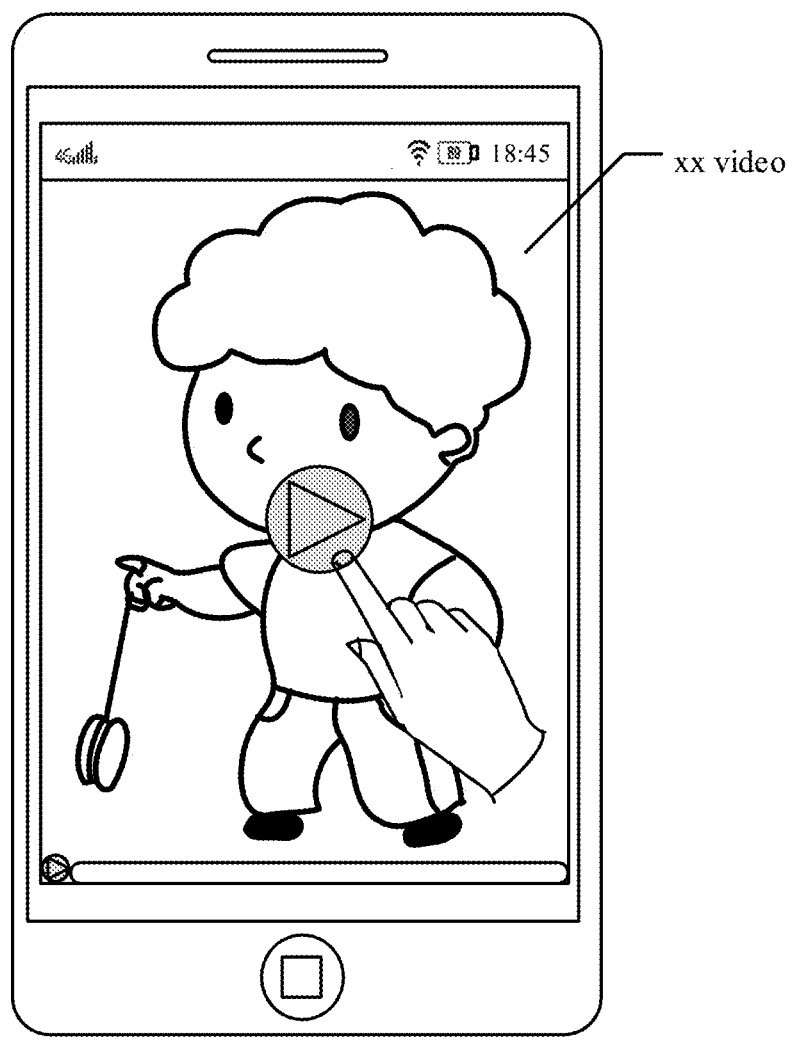
FIG. 4b is a diagram of an application scenario of a second UI according to an embodiment of the disclosure.
Figure 4C:
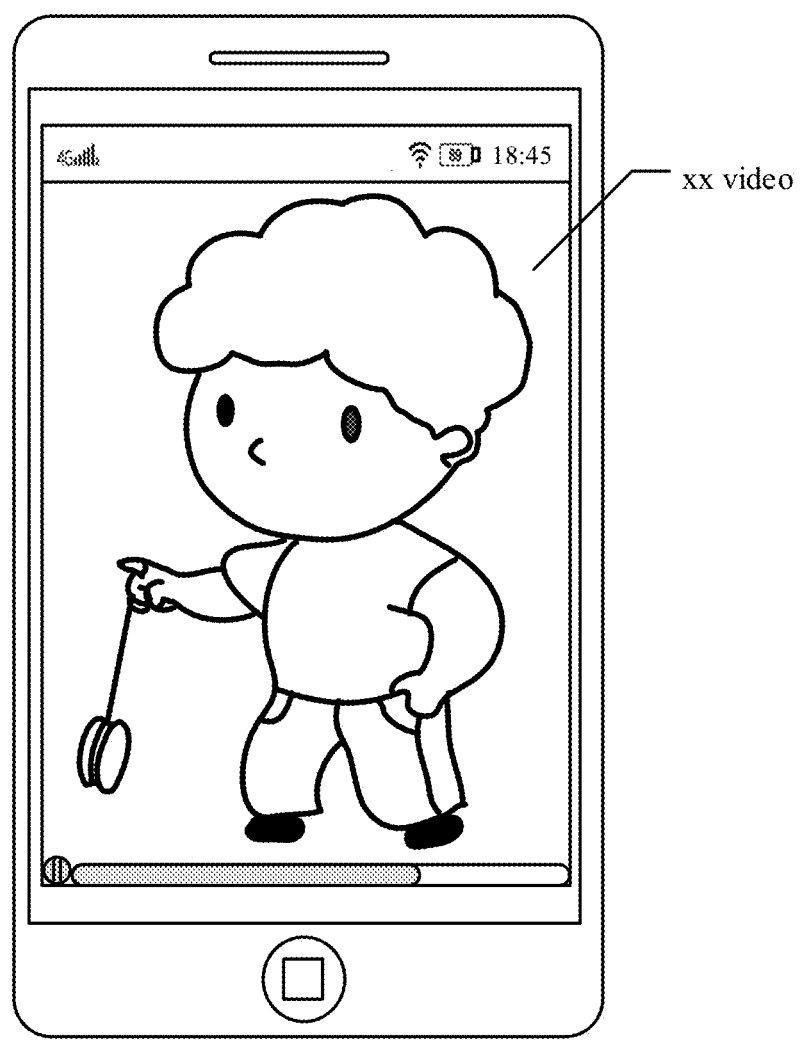
FIG. 4c is a diagram of an application scenario of a second UI according to an embodiment of the disclosure.

In operations S204 and S205, the second resource list carries all data that the second UI requires to display. Therefore, a layout of the second UI may be determined according to the second resource list, and the second UI is displayed based on the determined layout. The embodiments of the disclosure may support the user to browse other multimedia in a process of playing the first multimedia in the pre-playing interface, and support to switch the playing of other multimedia. In an implementation, in a process of playing the resource content of the first multimedia in the second UI, if a browse operation of the user for the second UI is detected, displaying of the second UI may be controlled according to the browse operation; the browse operation herein may include a sliding operation, a voice operation, a character input operation, and the like. For example, as shown in FIG. 4a, the user may slide up or down in the second UI to browse other multimedia in the second UI. In this case, a playing process of the first multimedia is not affected, in other words, the second UI supports to allow the user to view other multimedia in the second UI through the browse operation when playing the first multimedia. In another example, the user may input a voice instruction in the second UI, for example, "please show other multimedia in the second UI, for example, xx video". In this case, the second UI responds to the voice instruction, stops the playing process of the first multimedia, and switches to the xx video to play. As shown in FIG. 4b, when the user browses other multimedia such the xx video in the second UI, the second UI still plays the first multimedia; when the user clicks a playing button of the xx video to trigger the playing of the xx video, the second UI responds to the switch instruction, stops the playing process of the first multimedia, and switches to display the xx video, as shown in FIG. 4c.

To implement functions of browsing other multimedia in the process of playing the first multimedia in the pre-playing interface and supporting switching to play other multimedia, the embodiments of the disclosure adopts a dual-player manner. Specifically, the terminal manages a player cache pool, the player cache pool may store two players, and it also stipulates that only one player is allowed to work on the multimedia APP globally at the same time, that is, two players are not allowed to work at the same time. The purpose of this regulation is to ensure the uniqueness and effectiveness of the multimedia playing control and to facilitate the management of the multimedia playing control process. The player may be obtained through an operation of the player cache pool uniformly. The dual-player manner may be as follows: the multimedia is enabled to establish a mapping relationship with the player through a multimedia identifier (for example, a video VID), and the corresponding multimedia is played by using a player that has a mapping relationship. At the beginning, a player (set to be a player 1) is randomly selected from the player cache pool to establish a mapping relationship with the currently to-be-played first multimedia, after the mapping relationship is established, the player 1 is adopted to play the first multimedia; when a trigger operation on other multimedia is detected in the same UI, for example: in a process of playing the first multimedia in the second UI, when the user clicks the fourth multimedia in the second UI, another player (set to be a player 2) may be selected from the player cache pool to establish a mapping relationship with the selected fourth multimedia, and the player 2 is adopted to play the fourth multimedia after the mapping relationship is established, and the player 1 stops playing the first multimedia at the same time, and the player 1 is returned to the player cache pool; a player in the player cache pool is in an idle state, and a player is configured to play the multimedia after being read from the player cache pool, so that the read player is in a working state. By analogy, when there is a new multimedia needed to be played, a player in the idle state is read from the player cache pool, if the read player that is in the idle state has a mapping relationship with a to-be-played multimedia, the read player may be adopted to play the to-be-played multimedia directly; if the read player that is in the idle state has a mapping relationship, but the mapping relationship is not with the to-be-played multimedia, the existing mapping relationship needs to be released, and the read player that is in the idle state needs to reestablish a mapping relationship with the to-be-played multimedia, after the mapping relationship is established, the player is adopted to play the to-be-played multimedia. A mapping relationship between a player and a multimedia may be a mapped binding between an identifier of a player and an identifier of a multimedia. A waiting time of player initialization and creation may be reduced by using a dual-player manner when the multimedia switches to play, thereby improving the playing efficiency. In addition, the player and the UI interface may be decoupled completely by using the dual-player manner, thereby implementing the function of the UI of browsing while playing, so that the process of the playing control is more flexible and controllable.

The embodiments of the disclosure may control playing of multimedia such as an audio, an image, and a video (a video with or without an audio), and provide diversified UIs. In a process of the multimedia playing control, a first resource list of a first UI may be obtained first, after a trigger operation on first multimedia of the first UI is detected, a second resource list is determined according to a resource type of the first multimedia, the first UI is switched to a second UI, and resource content of the first multimedia is played in the second UI. Switching of the UI may be triggered through a trigger operation of the user on the first multimedia, thereby enriching the UI display effects; and the resource type of the first multimedia is used for analyzing the interests and/or hobbies of the user, and the second resource list of the second UI is determined accordingly, so that the multimedia in the second resource list may better meet the actual playing requirements of the user, thereby improving the flexibility and intelligence of the multimedia playing control, and improving the product competitiveness and user stickiness.

Figure 5:
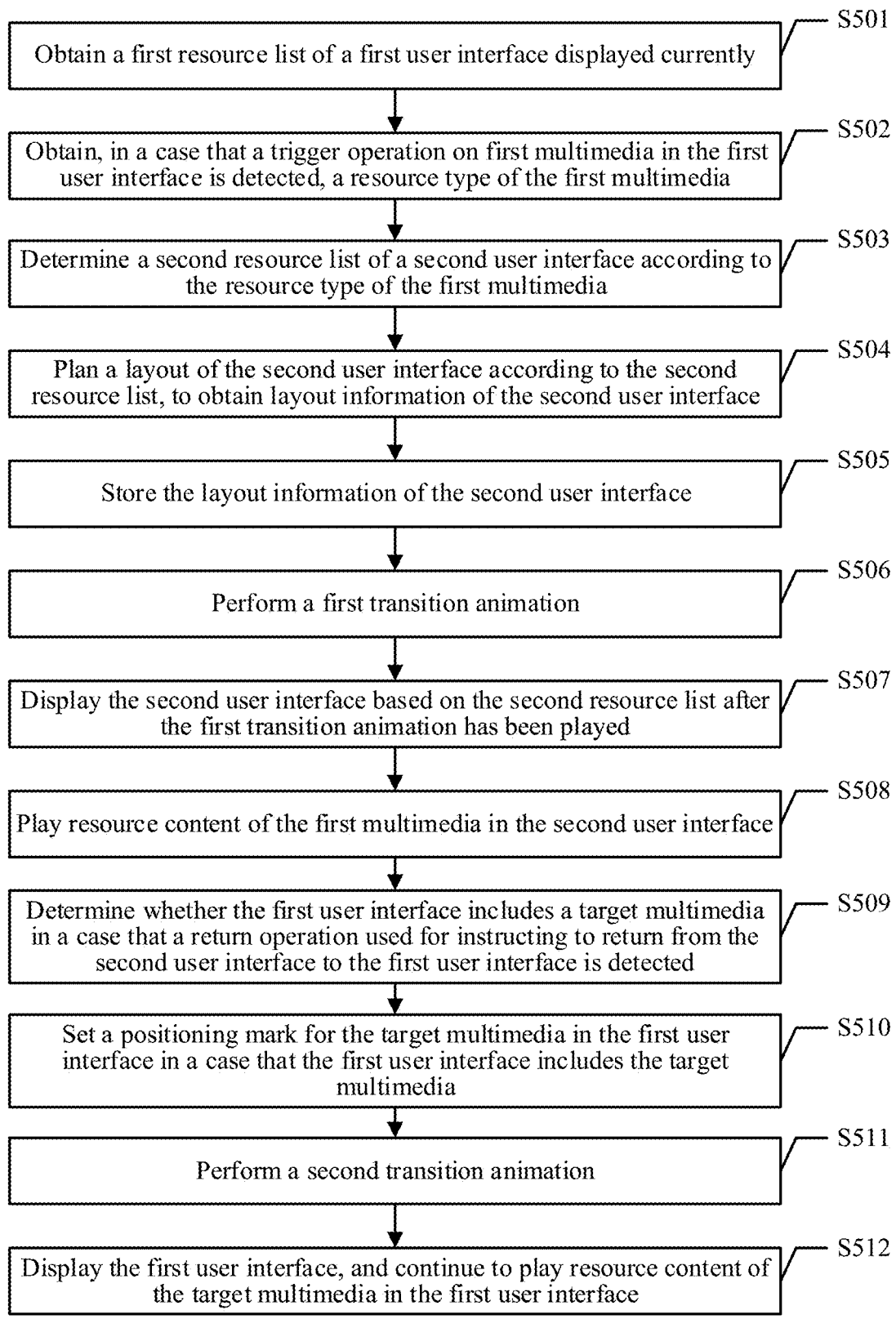
FIG. 5 is a schematic flowchart of a multimedia playing control method according to an embodiment of the disclosure.

Based on the foregoing description, the embodiments of the disclosure further provide a multimedia playing control method. Referring to FIG. 5, the multimedia playing control method may be performed by any terminal shown in FIG. 1. As shown in FIG. 5, the multimedia playing control method may include the following operations S501 to S512.

S501. Obtain a first resource list of a first UI displayed currently, the first resource list including one or more pieces of multimedia.

S502. Obtain, in a case that a trigger operation on first multimedia in the first UI is detected, a resource type of the first multimedia.

For description of operations S501 and S502, reference may be made to operations S201 and S202 in the embodiment shown in FIG. 2, and details are not repeated herein.

S503. Determine a second resource list of a second UI according to the resource type of the first multimedia, the second resource list including at least the first multimedia.

The second UI refers to an interface displayed after the first UI performs interface switching according to the trigger operation on the first multimedia, the second UI may be a pre-playing interface of the first multimedia. For example, if the first multimedia is a video, the second UI may be a preview interface of the video. Because the first multimedia may be a multimedia that the user is interested in and selected by the user in the first UI, the resource type of the first multimedia may represent the interests and/or hobbies of the user to some extent. For example, if the resource type of the first multimedia is a video, it represents that the user is interested in playing a video, and in operation S503, video data may be added to the second resource list to play for the user. Herein, the second resource list may refer to the foregoing table 2.

In an example implementation, operation S503 may include the following operations s11 and s12.

s11. Obtain second multimedia whose resource type belongs to the same type as the resource type of the first multimedia from the first resource list.

s12. Add the first multimedia and the second multimedia to the second resource list.

The resource type includes any one of the following: audio, video, text, and image. Operations s11 and s12 describe other multimedia of the same resource type as the first multimedia and that is sifted out (or selected) from the first resource list, the second resource list may be formed by the first multimedia and the sifted other multimedia together; for example, if the first multimedia is a video, a part or all of video data in the first resource list may be sifted out and added to the second resource list. In this implementation, because all the multimedia in the second resource list are from the first resource list, to better implement the multimedia playing control, properties of the multimedia in the second resource list keep consistent with the properties of the multimedia in the first resource list.

In another implementation, operation S503 may include the following operations s21 and s22:

s21. Obtain third multimedia to be recommended according to the resource type of the first multimedia.

s22. Add the first multimedia and the third multimedia to the second resource list.

Operations s21 and s22 describe recommending multimedia related to the resource type of the first multimedia to the user according to the operation strategy, and the second resource list is formed by the first multimedia and the recommended multimedia together. For example, if the first multimedia is a comedy video, some recommended comedy video may be sifted out from the Internet or a database according to the operation strategy and added to the second resource list. In this implementation, because other multimedia in the second resource list than the first multimedia are from the Internet or the database, to better implement the multimedia playing control and multimedia recommendation, sequence numbers of the multimedia in the second resource list need to be set according to the actual requirements.

In the embodiments of the disclosure, the UI may adopt the data model to carry the resource list. For example, the first UI corresponds to a first data model, and the first data model is configured to carry the first resource list; the second UI corresponds to a second data model, and the second data model is configured to carry the second resource list. A binding/unbinding mechanism based on the data model may control the data synchronization of the UI. For example, the first data model is assigned to the second data model, then data requirements of the second resource list in the implementation shown in operations s11 and s12 may be implemented, and data consistency between the second UI and the first UI may be maintained. In another example, a recommendation data model is created and initialized, and the recommendation data model is assigned to the second data model, then data requirements of the second resource list in the implementation shown in operations s21 and s22 may be implemented.

S504. Plan a layout of the second UI according to the second resource list, to obtain layout information of the second UI.

S505. Store the layout information of the second UI.

To facilitate implementing the multimedia playing control, the multimedia may be stored in a preset data structure, and the preset data structure may include, but is not limited to, a television board data structure, a fast board data structure, a cinema board data structure, and the like. In the embodiments of the disclosure, for purpose of illustration, an example is described in which the multimedia in the second resource list in second UI is in the cinema board data structure, and the multimedia of other UIs (including the first UI) is in the television board data structure. In operations S504 and S505, because a layout rule of the second UI may be predetermined according to an operation requirement, the layout rule herein may include, but is not limited to: a display sequence and a display location of the multimedia in the second resource list in the second UI, UI styles of the second UI, a quantity of multimedia that the second UI displays on a terminal screen at a time, and the like. In addition, because the data structure of the second UI is determined (that is, the cinema board data structure), once the multimedia data in the second resource list is obtained, layout information of all multimedia in the second UI may be determined in advance. Compared with the existing real-time calculation of the layout information of the to-be-played multimedia, the embodiments of the disclosure may determine the layout information of all multimedia in the second UI asynchronously in advance, and cache the calculated layout information corresponding to the multimedia in advance, thus, the cached layout information corresponding to the multimedia may be directly called when playing the multimedia, thereby effectively improving the response speed of the multimedia APP and the performance of the client.

S506. Perform a first transition animation.

The terminal may perform a transition animation when switching the interface, and the transition animation may be determined by the switched interface and completed by a target switching interface. For example, when switching from the first UI to the second UI, the currently switched interface is the first UI, and the target switching interface is the second UI, then the transition animation may be determined by the first UI and completed by the second UI. In another example, when switching from the second UI to the first UI, the currently switched interface is the second UI, and the target switching interface is the first UI, then the transition animation may be determined by the second UI and completed by the first UI.

Operation S506 may include the following operations s31 and s32.

s31. Obtain a first transition control parameter corresponding to the first UI.

s32. Play the first transition animation according to the first transition control parameter.

In the embodiments of the disclosure, one UI corresponds to one ONAView control. To implement the transition animation, the embodiments of the disclosure may provide a multimedia query location interface, then provide the multimedia query location interface for the ONAView corresponding to the UI to implement the transition animation. The multimedia query location interface includes the following functions: (1) querying whether the current UI includes a multimedia; (2) querying a carrying view of a player corresponding to the current multimedia, the carrying view herein may be a view that carries current resource content of a multimedia currently played by the player; (3) querying a layout location of the carrying view of the current player relative to the terminal screen or the UI, that is, querying location information of the current player.

Figure 6:
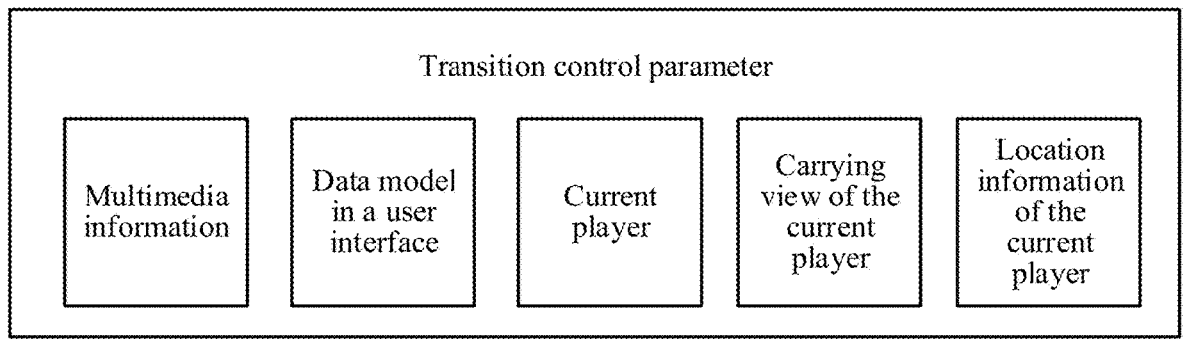
FIG. 6 is a schematic diagram of transition control parameter information according to an embodiment of the disclosure.

When calling the ONAView to implement the transition animation, a transition control parameter corresponding to the transition animation needs to be transferred between the currently switched interface and the target switching interface. As shown in FIG. 6, the transition control parameter information may include, but is not limited to: multimedia information, a data model corresponding to a UI, a current player, a carrying view of the current player, location information of the current player, and the like. The transition control parameter information may be stored uniformly, and the transition control parameter may be divided into a transition animation obtaining control parameter, a transition animation end reset parameter, and the like. To implement the interface switching, the transition control parameter information may be stored globally for easy access, and the management of the transition control parameter information may be uniformly completed by a management module in the terminal. Main functions of the management module may be as follows: (1) setting a transition control parameter transferred when switching from another interface to the target switching interface; (2) obtaining the transition control parameter transferred when switching from another interface to the target switching interface; (3) verifying whether the transition control parameter is valid; (4) destroying the transition control parameter.

The first transition animation refers to an animation displayed when switching from the first UI to the second UI; the first transition animation may be determined by the first UI and performed by the second UI. The first transition animation may include a custom animation and a system default animation. In operation s31, when obtaining the first transition control parameter corresponding to the first UI, the first transition control parameter may be generated by calling the first UI, and specific operations are as follows:

A-1) Capture a trigger event in the first UI through the ONAView corresponding to the first UI, the trigger event may be an event generated when performing a trigger operation on the first multimedia in the first UI.

A-2) Query whether the first UI includes the first multimedia by calling the multimedia query location interface through the ONAView.

A-3) Obtain a current player related to the first multimedia according to the multimedia identifier of the first multimedia by calling an interface of the management module through the ONAView.

A-4) Call the multimedia query location interface to query location information of the current player, that is, to query location information of the carrying view of the current player relative to the terminal screen or the UI.

A-5) Generate an interface switching transfer control information structure and fill in corresponding information.

A-6) Call a uniform management module to set the first transition control parameter.

It may be learned from the foregoing that, the multimedia query location interface may be provided for the ONAView to implement the transition animation, and when calling the ONAView to implement the transition animation, a control parameter needs to be transferred between the currently switched interface and the target switching interface. Therefore, after the first UI generates the first transition control parameter, the first transition control parameter needs to be transferred to the second UI.

In operation s12, when playing the first transition animation according to the first transition control parameter, the second UI may be called to receive the first transition control parameter, and the first transition animation is performed according to the first transition control parameter. If there is a custom animation, the following procedures may be followed.

B-1) The second UI receives a callback from a system interface.

B-2) Call a uniform management module to obtain the first transition control parameter.

B-3) Call the uniform management module to check the validity of the first transition control parameter; and the validity herein may include that: a data format of the first transition control parameter is correct, and/or the first transition control parameter has a corresponding custom animation.

B-4) Terminate the custom transition animation procedure and directly perform the system default animation in a case that the first transition control parameter is invalid.

B-5) Continue to perform the custom transition animation procedure in a case that the first transition control parameter is valid.

B-6) Obtain information of the first multimedia from the first transition control parameter information.

B-7) Obtain a current player related to the clicked first multimedia and a carrying view of the current player from the first transition control parameter information.

B-8) Obtain location information of the current player related to the clicked first multimedia from the first transition control parameter information.

B-9) Calculate layout information of the second UI, and extract a playing view location of the first multimedia in the second UI.

B-10) Call an animation execution module to perform the first transition animation on the carrying view of the current player obtained in B-7) according to the location information of the current player of B-8) and the playing view location of the first multimedia of B-9) in the second UI.

B-11) Call the uniform management module to reset the first transition control parameter to avoid a misreading.

When performing the first transition animation, the terminal may further transfer the current player corresponding to the first UI to the second UI in addition to transferring the first transition control parameter to the second UI, to realize current playing, which means that the playing procedure of the multimedia is uninterrupted when entering the second UI, that is, seamless playing.

S507. Display the second UI based on the second resource list after the first transition animation has been played.

The first UI may include, but is not limited to any one of the following: a main interface, a multimedia recommendation interface, a display interface of a multimedia portfolio, a personal homepage interface, a display interface of a collection portfolio, and the like. In addition, the first UI may include various types of multimedia such as text, audio, videos, and images. Therefore, the first UI before switching to the second UI is undetermined, and the multimedia data and the UI styles may not be singular. For example, in an interface, there may be views such as a blank occupation, a cutting line, and an advertisement in addition to the multimedia poster. However, the multimedia data in the second UI is in the cinema board data structure, simply realizing the direct reuse of the first data model corresponding to the first UI, cannot meet the requirements of multimedia APP's playing diversity and high availability/usability. Based on this, the embodiments of the disclosure further provide an implementation solution, the solution adopts a middleware idea, to achieve transformation from diversified UI-style data to a single UI-style data and the data synchronization. Details of the solution are as follows:

First, a universal adaptive intermediate data structure may be defined, the intermediate data structure may carry information content such as multimedia playing information and the multimedia poster, and is used for representing the second UI, and the intermediate data structure may be in a cinema board data structure. In addition, an interlayer conversion tool may be defined, the interlayer conversion tool may be configured to implement a conversion from other data structures to the universal adaptive intermediate data structure. When a new ONAView view is added, its conversion to the cinema board data structure may be supported only in the interlayer conversion tool, no major adjustments to the current UI are required, which is more flexible. For the ONAView views that do not include multimedia information such as the blank occupation, the cutting line, and the advertisement, the interlayer conversion tool does not have conversion interfaces corresponding to the ONAView views. Therefore, in a process of converting the data structure, the interlayer conversion tool does not convert the ONAView views into the cinema board data structure.

In addition, a uniform data access model (hereinafter referred to as a bridge model) may be defined for the second UI, and the data structure in the bridge model is a single universal adaptive intermediate data structure (the cinema board data structure), and the second UI may obtain multimedia data through the bridge model during UI rendering. The bridge model may support binding of an external interface model (hereinafter referred to as a bind model), and the external interface herein may be a UI other than the second UI, for example, the first UI. When displaying the second UI, the second UI may obtain required multimedia data from the bridge model. Therefore, the bridge model of the second UI is based on a consumer, and the bind model acts like a producer of multimedia content. Specifically, the bind model may be responsible for a request of network data to request the multimedia data, and an analysis of the multimedia data. After the multimedia data request succeeds, the interlayer conversion tool may be used to convert the multimedia data, then cinema board data obtained through conversion is copied to the bridge model of the second UI. Through this manner, data isolation between the bridge model and the bind model of the second UI may be implemented. The interlayer conversion tool may filter non-playable multimedia data, the non-playable multimedia data herein may include, but is not limited to: the advertisement, the blank occupation, and the cutting line. Therefore, data such as the advertisement, the blank occupation, and the cutting line may not enter the second UI. Because the data is isolated, in a process of the interlayer conversion tool filtering the non-playable multimedia data, the data model (for example, the bridge model) corresponding to the second UI may not be affected.

Before switching from the first UI to the second UI, the terminal may set the bind model through the uniform management module; after entering the second UI, the terminal may read a bind model of an external quasi-synchronous interface (for example, the first UI) through the uniform management module, and bind the bind model of the external quasi-synchronous interface and the bridge model of the second UI.

The user may slide up and down in the second UI to view and play multimedia, and in this case, the terminal is triggered to perform a data load operation. When the data load operation is triggered, the second UI may capture the operation and call a request interface corresponding to the bridge model. After receiving a call command, the bridge model may turn to call an interface corresponding to the bind model. After a bind model data request is successfully returned to a packet, the interlayer conversion tool may be used to perform data conversion on multimedia data requested successfully, and the data may be synchronized to the bridge model of the second UI.

Therefore, the foregoing solution may solve the problem of data synchronization between the bind model and the data model (the bridge model) corresponding to the second UI and achieves excellent data synchronization. The terminal may adopt an MVC (model view controller) architecture to implement this solution. The MVC used herein is an abbreviation of a model-view-controller, and is a software design paradigm. The MVC uses a service logic, data, and an interface display isolation method to organize code, aggregates the service logic into a component, and there is no need to rewrite the service logic when improving and personalizing the UI and the user interaction.

Because the UI and the data model are bound under the MVC architecture, if the data model changes, the controller may be notified to update immediately. Therefore, when solving the problem of data model synchronization, a problem of unnecessary controller update caused by the model synchronization further needs to be solved at the same time. Specifically, if there is no processing after binding the bind model to the bridge model, when the current UI (for example, the second UI) loads more multimedia data, a controller update of a previous UI (for example, the first UI) is triggered. A consequence of the update may be a redundant refresh operation, and the redundant refresh operation may affect the performance of the multimedia APP. The consequence of the update may further trigger some unnecessary multimedia exposure related operations, and the like. Therefore, the consequence of no processing may bring a great quantity of uncertainty.

Based on this, the embodiments of the disclosure adopt a data model binding/unbinding mechanism, the data model binding/unbinding mechanism is mainly that: a data model of each UI implements a set of model bind/unbinding owner protocol, each UI controller implements a set of model owner protocol, and each UI may be regarded as the owner of the data model. The model bind/unbinding owner protocol includes the following content: registering a model current owner; unbinding the model current owner; binding the model to one owner, and supporting context information transfer; synchronizing the model to one owner, and supporting the context information transfer; querying the model current owner; and querying a previous owner of the model. The model owner protocol may include the following content: the model is about to be unbound from an old owner and bound to a new owner, and the context information transfer is supported; the model is unbound from the old owner and bound to the new owner, and the context information transfer is supported; and the model synchronizes callback receiving, supports a current owner, a to-be-synchronized owner, and the context information transfer.

Operating procedures of the model bind/unbinding owner protocol and the model owner protocol may be as follows, an example of simulating a user operation is used to illustrate the operating procedure of the entire solution: the first UI implements the model owner protocol, the data model corresponding to the first UI is Model_1, and the Model_1 implements the model bind/unbinding owner protocol.

The user may click a multimedia poster in the first UI to enter the second UI, and the terminal binds the Model_1 corresponding to the first UI to the bridge model of the second UI. In this case, a previous owner of the Model_1 points to the first UI, the Model_1 notifies the first UI that the Model_1 is about to be unbound from the first UI through the model bind/unbinding owner protocol, and to be bound to the second UI again. The first UI receives an unbinding callback of the Model_1, releases a data association between the controller of the first UI and the Model_1, but the Model_1 still remembers the previous owner as the first UI. A current owner of the Model_1 is the second UI, and the second UI receives a binding callback of binding the Model_1 to the second UI, and the second UI is refreshed.

When the user loads more multimedia data by performing the sliding operation in the second UI, the bridge model of the second UI may request the multimedia data through the Model_1. When the request succeeds, the interlayer conversion tool may be used to convert a data structure, and the converted multimedia data is copied to the bridge model of the second UI. In this case, because the data association between the Model_1 and the first UI is released, the UI of the first UI remains unchanged.

Every time the user performs the sliding operation in the second UI, the terminal may implement a model binding/unbinding protocol through the Model_1, notify a previous binder of the Model_1, that is, the first UI, to perform a data synchronization processing, and use information of the to-be-played multimedia as the context to be transferred to the first UI. After receiving a synchronization callback, the first UI may parse the context information, to obtain the information of the to-be-played multimedia. The first UI temporarily restores the data association between the Model_1 and the controller of the first UI. In this case, a current owner of the Model_1 points to the first UI, and a previous owner of the Model_1 points to the second UI. The first UI reads data in the Model_1, and if there is a difference between the data in the Model_1 and data shown in the first UI, the refresh operation of the first UI is performed first. The first UI reads the information of the multimedia obtained by parsing the context, and queries an ONAView corresponding to the multimedia at the same time, slides the first UI to a location of the ONAView in advance to prepare to exit the transition animation of the second UI. The data association between the Model_1 and the controller of the first UI is released again, in this case, a previous owner of the Model_1 points to the second UI; a binding interface of the Model_1 is called to bind the Model_1 to the previous owner of the Model_1 again, that is, the second UI, in this case, a previous owner of the Model_1 points to the first UI.

The second UI is about to exit, and a previous owner of the Model_1 is queried to be the first UI through the model bind/unbinding owner protocol and the model owner protocol, the Model_1 is bound to the first UI, and the information of the multimedia of the second UI is used as a context parameter to be transferred to the first UI. The first UI receives a piece of information that the Model_1 is bound to the first UI again, restores the data association between the Model_1 and the controller of the first UI, in this case, a current owner of the Model_1 points to the first UI, and a previous owner of the Model_1 points to the second UI. The first UI determines whether there is a difference between the data in the Model_1 and the data shown in the interface, if there is the difference, the refresh operation of the first UI is performed. The first UI reads the context information in the callback, parses the information of the multimedia, calculates a location of the ONAView corresponding to the multimedia poster, and slides the first UI to a designated location. The second UI is destroyed, in this case, a previous owner of the Model_1 points to the second UI, and a current owner of the Model 1 points to the first UI.

Therefore, a terminal framework may support flexible binding of the bind model, and support rapid access of diversified multimedia data to the multimedia playing. Because the terminal framework is flexible enough, when switching to the second UI, whether to bind the bind model to the second UI may be completely controlled in the backend. Specifically, control information may be added to a multimedia information structure television board in the backend to implement the flexible binding of the bind model, and the control information herein may include whether the current interface model needs to be bound, recommendation request parameter information, and the like.

Therefore, to meet data requirements of the second resource list of the second UI, the second UI may set a default second data model that is configured to pull recommendation data, for example, the foregoing bridge model. When the first multimedia in the first UI is clicked for interface switching, information related to the first multimedia may be read, the information related to the first multimedia may include the resource type of the first multimedia. If the first data model of the first UI needs to be bound, resource list information of the first UI is shown synchronously, then the entire procedure may be referred to the specific implementation of the foregoing implementation solutions. If the control information displays that the first data model of the first UI does not need to be bound, the second UI needs to show a recommended multimedia related to the first multimedia, then a recommendation data model is created and initialized, and the recommendation data model is assigned to a second data model of the second UI, to ensure a life cycle of the recommendation data model. Besides, the recommendation data model and the second data model of the second UI may be bound actively, and a series of procedures after the binding may be referred to the specific implementation of the foregoing implementation solutions.

In addition, because a binding injection mode is adopted, an implementation of the recommendation data model and the second UI are independent, subsequent changes to the recommendation data model or an access to the new data model caused by service adjustments may simply be made by adjusting the interlayer conversion tool, and the UI logic of the second UI may not be affected, thereby ensuring the high availability and usability of the multimedia APP to the great extent.

S508. Play resource content of the first multimedia in the second UI.

It may be learned from the foregoing that, in the embodiments of the disclosure, when switching from the first UI to the second UI, a playing procedure of the first multimedia may not be interrupted, to implement a seamless connection in the second UI, and continue to play the remaining resource content of the first multimedia. Specifically, operation S508 may include the following operations s41 to s43.

s41. Determine whether the first multimedia is played in the first UI.

s42. Obtain, in a case that the first multimedia is played in the first UI, first playing duration of the first multimedia in the first UI.

s43. Continue to play the resource content of the first multimedia in the second UI according to the first playing duration.

For example, the resource type of the first multimedia is at least one of an audio, an image, or a video, total playing duration of the first multimedia is 40 s (or 40 seconds), and it is detected that the first multimedia has been played in the first UI for 15 s (or 15 seconds), that is, the first playing duration of the first multimedia in the first UI is 15 s. In this case, when the first multimedia is played in the second UI, the resource content of the first multimedia may continue to be played for the remaining 25 s. Alternatively, in an embodiment, the second UI may continue to play from resource content corresponding to the fifteenth second of the first multimedia.

If the resource type of the first multimedia is a video, the resource content of the video may alternatively be played in the second UI according to a frame image of the video. Specifically, it may be determined whether the first multimedia is previewed in the first UI; if the first multimedia is previewed in the first UI, a current frame image of the first multimedia in the first UI is obtained; and the resource content of the first multimedia continues to be played in the second UI according to the current frame image. For example, the resource type of the first multimedia is a video, and the video has 5 frames of images in total. When switching from the first UI to the second UI, a current frame image played in the video in the first UI is obtained to be the third frame image. When the video is played in the second UI, the video may continue to be played from the fourth frame image of the video. Alternatively, in an embodiment, the second UI may continue to play the video from the third frame image of the video.

S509. Determine whether the first UI includes a target multimedia in a case that a return operation used for instructing to return from the second UI to the first UI is detected.

The target multimedia is a multimedia displayed in the second UI currently when the terminal detects the return operation used for instructing to return from the second UI to the first UI. For example, the return operation is detected when the second UI displays the first multimedia, then the target multimedia is the first multimedia. In another example, the return operation is detected when the second UI plays fourth multimedia, then the target multimedia is the fourth multimedia. It may be learned from the foregoing that, the multimedia data in the second resource list may be the same as the multimedia data in the first resource list, or may be different from the multimedia data in the first resource list. Therefore, when detecting the return operation used for instructing to return from the second UI to the first UI, the terminal needs to determine whether the first UI includes the target multimedia. If the first UI does not include the target multimedia, a positioning mark may be set for the first multimedia in the first UI, and the resource content of the first multimedia is played in the first UI. The first multimedia is a multimedia clicked by the user when triggering to switch from the first UI to the second UI, and therefore, the positioning mark is set for the first multimedia in the first UI, so that the user may clearly know the multimedia displayed in the first UI before switching to the second UI. If the first UI includes the target multimedia, operation S510 may be performed.

S510. Set a positioning mark for the target multimedia in the first UI in a case that the first UI includes the target multimedia.

By setting the positioning mark for the target multimedia in the first UI, when viewing the first UI, the user is easy to know a multimedia current played in the second UI clearly when returning from the second UI to the first UI. The positioning mark herein may include an image mark, a color mark, a shape mark, a location mark, and the like.

If the positioning mark is an image mark, the terminal may mark the target multimedia by using images such as a block and a circle in the first UI; if the positioning mark is a color mark, the terminal may mark the target multimedia with colors in the first UI, for example, the target multimedia is marked by using a red block, a purple block, and other colors, or the target multimedia is marked in a highlight manner.

If the positioning mark is a shape mark, the terminal may mark the target multimedia and other multimedia in the first UI by using different shapes and sizes in the first UI, for example, a size of the target multimedia is larger than sizes of other multimedia in the first UI, or a size of the target multimedia is smaller than sizes of other multimedia in the first UI. The size of the target multimedia is different from the sizes of other multimedia in the first UI, so that the user may clearly know a previous multimedia played in the second UI.

If the positioning mark is a location mark, in the first UI, the terminal may place the target multimedia at a specific location in the first UI. The specific location may be set by the user, or may be determined by the terminal according to service requirements, and the specific location may be an upper left corner, an upper right corner, a center area, and the like of the first UI.

S511. Perform a second transition animation.

The second transition animation refers to an animation displayed when switching from the second UI to the first UI. Therefore, the second transition animation may be determined by the second UI and performed by the first UI. The second transition animation may be the same as the first transition animation, or may be different from the first transition animation. The second transition animation may include a custom animation and a system default animation.

Operation S511 specifically includes the following operations s51 and s52.

s51. Obtain a second transition control parameter corresponding to the second UI.

s52. Play the second transition animation according to the second transition control parameter.

It may be learned from the foregoing that, one UI corresponds to one ONAView control in an embodiment. A multimedia query location interface may be provided for the ONAView of the UI, so that the transition animation is implemented by calling the ONAView. In operation s51, when obtaining the second transition control parameter corresponding to the second UI, the second transition control parameter may be generated by calling the second UI. In an example, operation S51 may include the following operations:

C-1) Capture a return event in the second UI through the ONAView corresponding to the second UI, the return event may be an event generated when performing a return operation on the target multimedia in the second UI.

C-2) Obtain information of the target multimedia played in the second UI currently by calling the multimedia query location interface through the ONAView.

C-3) Obtain layout information of the target multimedia, and extract location information of the current player.

C-4) Obtain a current player related to the target multimedia according to the multimedia identifier of the target multimedia by calling an interface of the management module through the ONAView.

C-5) Generate an interface switching transfer control information structure and fill in corresponding information.

C-6) Call a uniform management module to set the second transition control parameter.

It may be learned from the foregoing that, the multimedia query location interface may be provided for the ONAView to implement the transition animation, and when calling the ONAView to implement the transition animation, a control parameter needs to be transferred between the currently switched interface and the target switching interface. Therefore, after the second UI generates the second transition control parameter, the second transition control parameter needs to be transferred to the first UI.

In operation s52, when playing the second transition animation according to the second transition control parameter, the first UI may be called to receive the second transition control parameter, and the second transition animation is performed according to the second transition control parameter. If there is a custom animation, the following procedures may be followed.

D-1) The first UI receives a callback from a system interface.

D-2) Call a uniform management module to obtain the second transition control parameter.

D-3) Call the uniform management module to check the validity of the second transition control parameter; and the validity herein may include that: a data format of the second transition control parameter is correct, and/or the second transition control parameter has a corresponding custom animation.

D-4) Terminate the custom transition animation procedure and directly perform the system default animation in a case that the second transition control parameter is invalid.

D-5) Continue to perform the custom transition animation procedure in a case that the second transition control parameter is valid.

D-6) Obtain information of the target multimedia from the second transition control parameter information.

D-7) Obtain layout information of the target multimedia in the second UI from the second transition control parameter information.

D-8) Obtain a current player related to the target multimedia in the second UI from the second transition control parameter information.

D-9) Traverse views of all ONAView views of the current first UI.

D-10) Query whether the ONAView includes the target multimedia by calling the multimedia query location interface through the ONAView.

D-11) Continue to call, in a case that the ONAView includes the target multimedia, the multimedia query location interface through the ONAView to query location information of the current player related to the target multimedia and stop traversing; otherwise, traverse the next, unit the last is traversed, or find an ONAView includes the target multimedia information.

D-12) Read, in a case that a correct ONAView is found through D-9), layout information of the ONAView, and call an animation execution module to perform the second transition animation with reference to the layout information of the target multimedia in the second transition control parameter.

D-13) Query a carrying view of the current player by calling the multimedia query location interface through the ONAView after the second transition animation is performed, and bind the carrying view to a player that is configured to play the target multimedia in the first UI. Because playing of the player may not be controlled in the entire procedure, seamless switching of the target multimedia may be implemented when switching from the second UI to the first UI.

D-14) Call, in a case that the correct ONAView is not found through D-9), the animation execution module to perform a system default animation.

D-15) Call the uniform management module to reset the second transition control parameter to avoid a misreading.

S512. Display the first UI, and continue to play the resource content of the target multimedia in the first UI.

After switching from the second UI to the first UI, the terminal may continue to play the resource content of the target multimedia in the first UI. In a specific implementation procedure, the terminal may obtain a current player corresponding to the second UI when performing the second transition animation, and transfer the obtained current player to the first UI, to continue to play the resource content of the target multimedia in the first UI with a seamless connection.

The resource type may include an audio, an image, or a video (video with or without audio). Correspondingly, when detecting a return operation used for instructing to return from the second UI to the first UI, the terminal may obtain playing duration of the target multimedia played currently in the second UI. The return operation herein may be a click operation, a voice operation, a sliding operation, a character input operation, and the like. Then the resource content of the target multimedia continues to be played in the first UI according to the playing duration of the target multimedia.

If the resource type of the target multimedia is a video, the resource content of the video may alternatively be played in the first UI according to a frame image of the video. Specifically, a current frame image of the target multimedia in the second UI may be obtained; and the resource content of the target multimedia continues to be played in the first UI according to the current frame image.

The embodiments of the disclosure may control playing of multimedia such as an audio, an image, and a video, and provide diversified UIs. In a process of the multimedia playing control, a first resource list of a first UI is obtained first, after a trigger operation on first multimedia of the first UI is detected, a second resource list is determined according to a resource type of the first multimedia, the first UI is switched to a second UI, and resource content of the first multimedia is played in the second UI. Switching of the UI may be triggered through a trigger operation of the user on the first multimedia, thereby enriching the UI display effects; and the resource type of the first multimedia is used for analyzing the interests and/or hobbies of the user, and the second resource list of the second UI is determined accordingly, so that the multimedia in the second resource list may better meet the actual playing requirements of the user, thereby improving the flexibility and intelligence of the multimedia playing control, and improving the product competitiveness and user stickiness.

FIG. 7a to FIG. 7e are diagrams of an application scenario of a multimedia playing control method according to the embodiments of the disclosure, the application scenario may be implemented based on a function of the multimedia APP, and the application scenario uses an example in which a resource type of the multimedia is a video, a first UI is a video recommendation interface of a multimedia APP, and a second UI is a video preview interface for description.

Figure 7A:
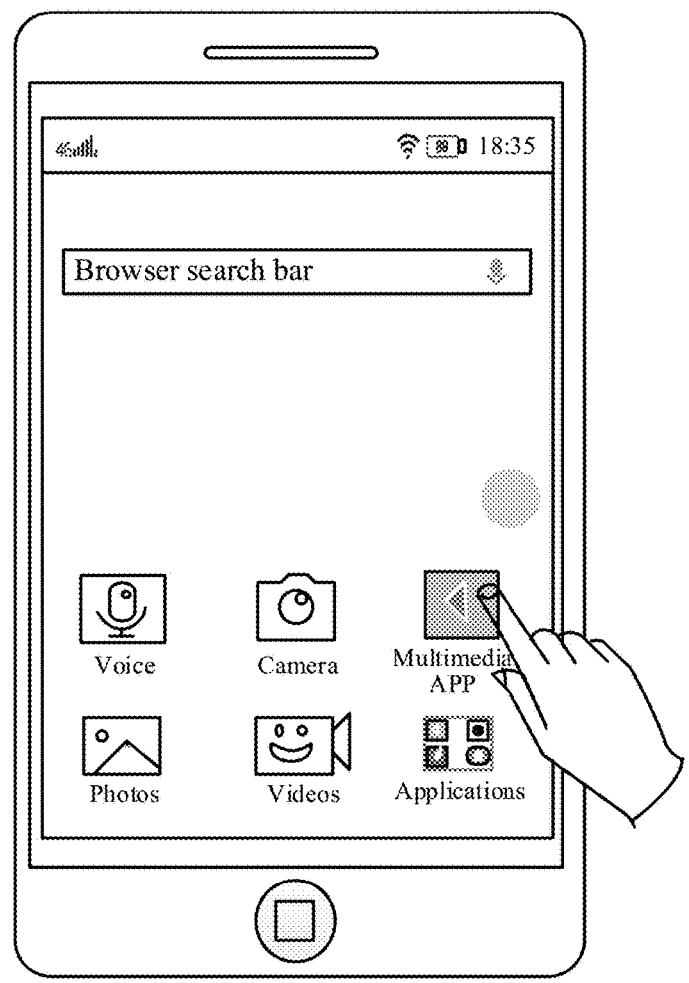
FIG. 7a is a diagram of an application scenario of a multimedia playing control method according to an embodiment of the disclosure.
Figure 7B:
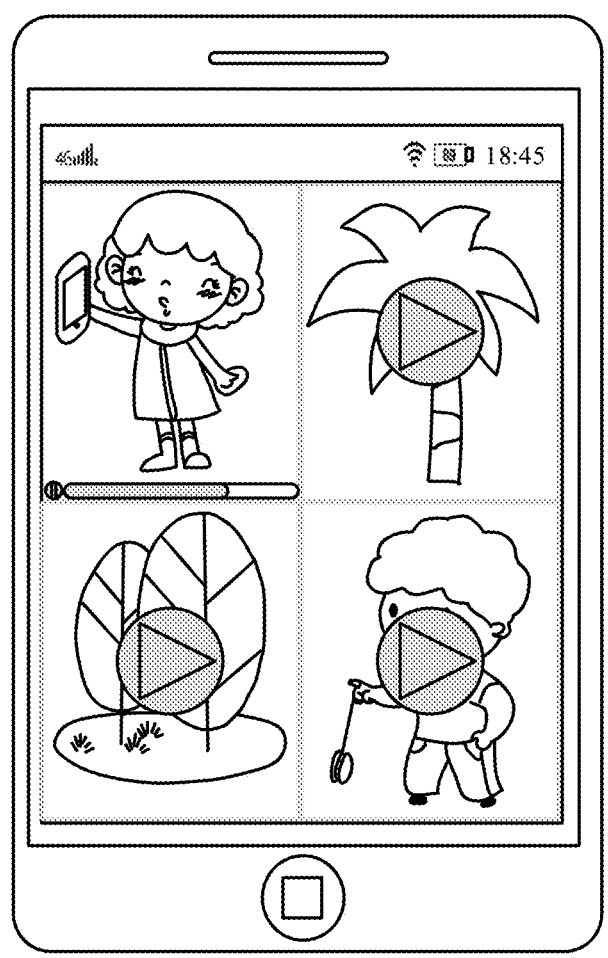
FIG. 7b is a diagram of an application scenario of a multimedia playing control method according to an embodiment of the disclosure.

As shown in FIG. 7a, when a user wants to play a video, the user may click a multimedia APP. After detecting a click instruction of the user, the terminal may start the multimedia APP, and transmits a request to a server to request the server to deliver resource lists of all multimedia exposure entry interfaces. After receiving the resource lists delivered by the server, the terminal may store the resource lists into a local storage space of the terminal. The user may click a video exposure entry in the multimedia APP to enter the video recommendation interface. In this case, the terminal may obtain a first resource list of the video recommendation interface from the local storage space, and display the resource content of the multimedia in the first resource list in the video recommendation interface. A style of the video recommendation interface may include, but is not limited to a nine-block-box style, a double waterfall flow style, a watermelon flow style, a full-screen card style, a personal center list style, and the like. As shown in FIG. 7b, the style of the video recommendation interface in the application scenario uses the double waterfall flow style as an example.

Figure 7C:
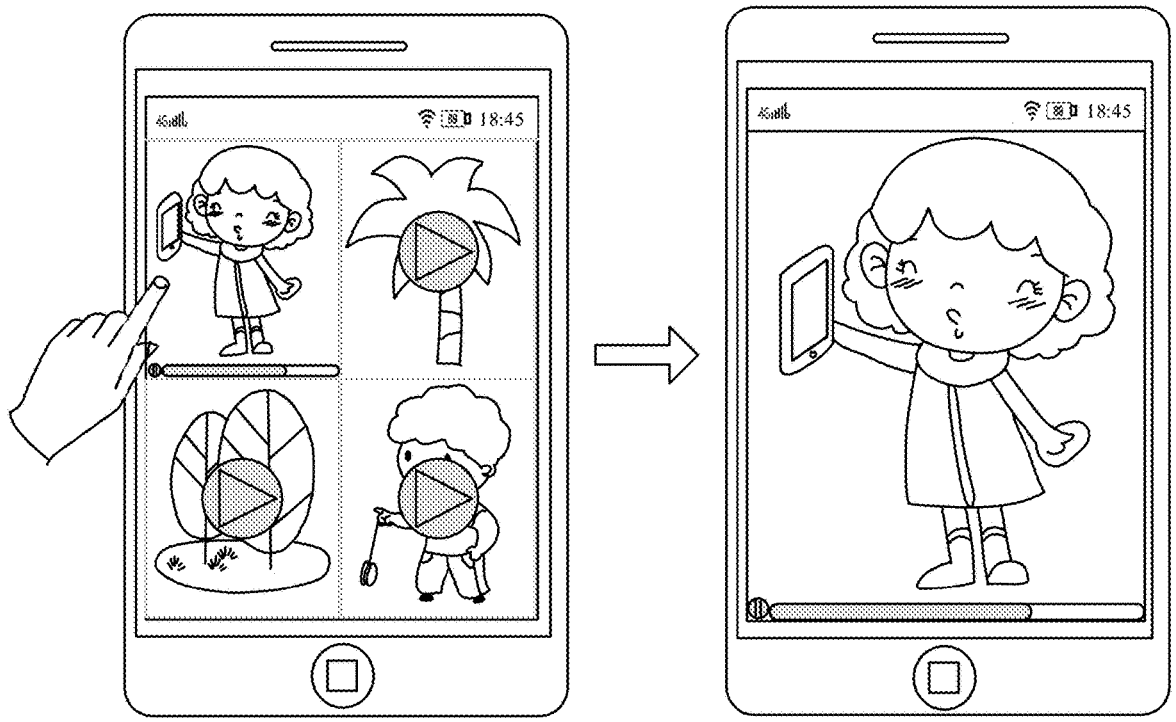
FIG. 7c is a diagram of an application scenario of a multimedia playing control method according to an embodiment of the disclosure.

The user may click a target video (that is, the first multimedia) in the video recommendation interface, after detecting the click instruction of the user, the terminal may switch from the video recommendation interface to the video preview interface in a form of the first transition animation, and determine a second resource list of the video preview interface according to a type of the target video. As may be learned from FIG. 7b, videos in the first resource list include a character video and a landscape video, and the target video clicked by the user is the character video, therefore, videos in the determined second resource list of the video preview interface are all character videos. As shown in FIG. 7c, after switching from the video recommendation interface to the video preview interface, the terminal may play the target video in the video preview interface. When playing the target video in the video preview interface, the terminal further needs to obtain played duration of the target video in the video recommendation interface; then continues to play the target video according to the played duration of the target video in the video preview interface, so that the video playing procedure is not interrupted in a process of interface switching, thereby implementing seamless playing.

The user may further perform a sliding operation in the video preview interface during playing of the target video, to view other videos than the target video in the video preview interface. For example, when the terminal detects that the user slides down, a video with a sequence number of 2 in the second resource list is displayed; when the terminal detects that the user slides down again, a video with a sequence number of 3 in the second resource list is displayed, and the rest may be deduced by analogy. The terminal may alternatively display circularly, for example, when the target video is displayed in the second UI, a last video in the second resource list is displayed when detecting that the user slides up. When the user browses and views other videos, the target video is still in a playing state. If it is detected that the user clicks another video in the video preview interface, the terminal stops playing the target video, and starts to play the another video clicked by the user.

Figure 7D:
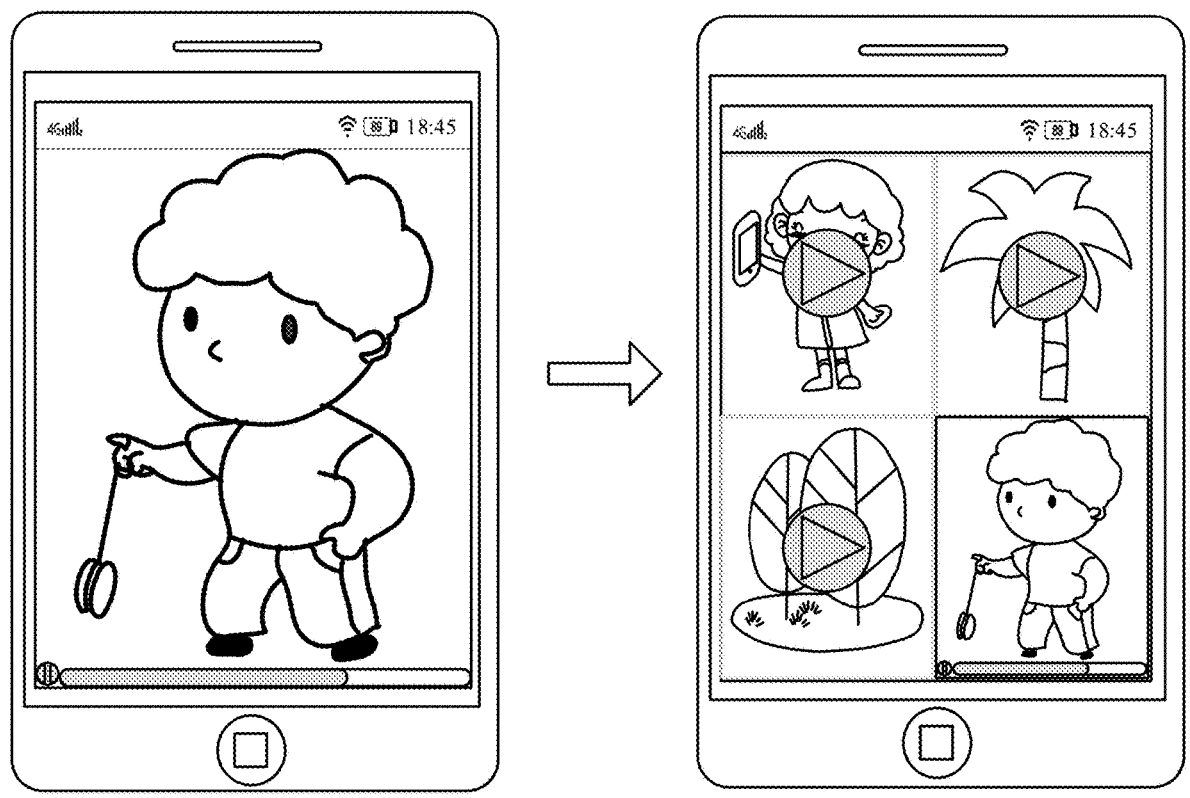
FIG. 7d is a diagram of an application scenario of a multimedia playing control method according to an embodiment of the disclosure.
Figure 7E:
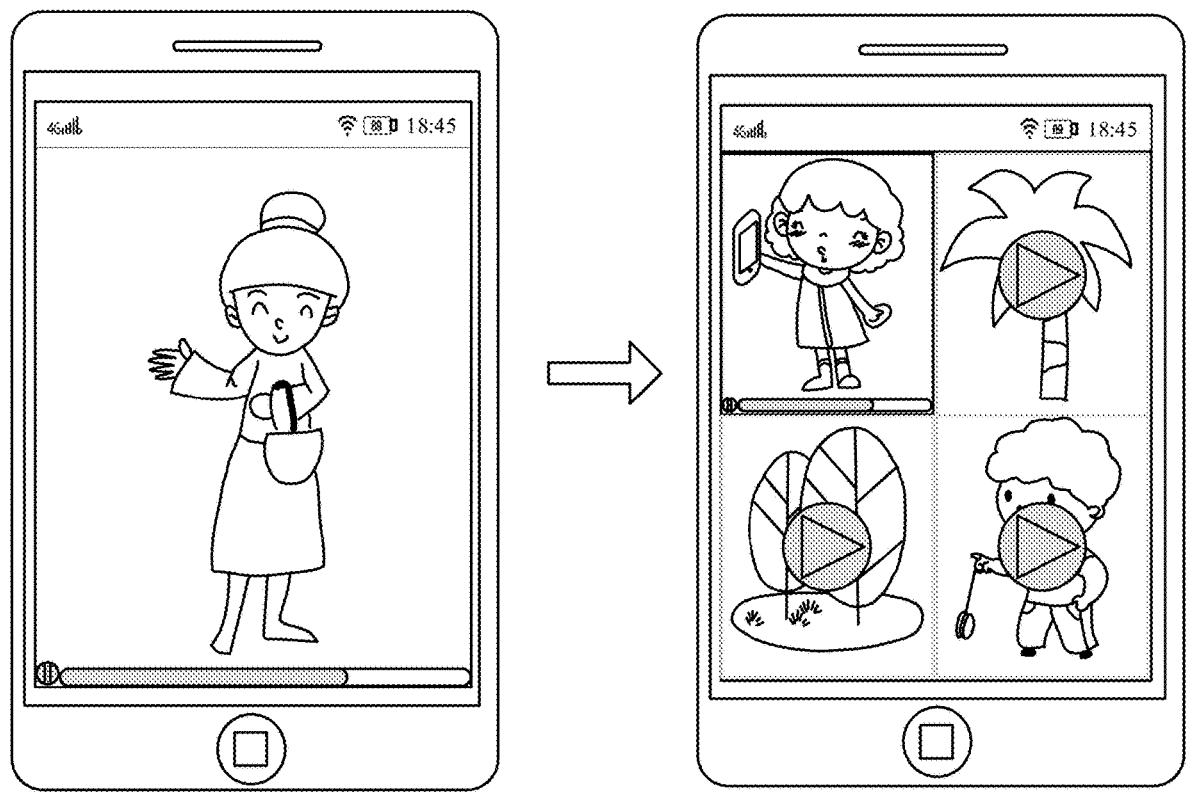
FIG. 7e is a diagram of an application scenario of a multimedia playing control method according to an embodiment of the disclosure.

When the user wants to return from the video preview interface to the video recommendation interface, the user may input a return operation to the terminal. After receiving the return operation, the terminal may switch from the video preview interface to the video recommendation interface in a form of the second transition animation, and obtain playing duration of a current video currently displayed in the video preview interface, and detect whether the video recommendation interface includes the current video. As shown in FIG. 7d, if the video recommendation interface includes the current video, the terminal may set a positioning mark for the current video in the video recommendation interface, for example, the positioning mark is a black block, and continue to play the current video in the video recommendation interface according to the playing duration of the current video. As shown in FIG. 7e, if the video recommendation interface does not include the current video, the terminal may set a positioning mark (a black block) for the target video in the video recommendation interface, and play the target video in the video recommendation interface.

The embodiments of the disclosure may control playing of multimedia such as an audio and a video, and provide diversified UIs. In a process of the multimedia playing control, a first resource list of a first UI may be obtained first, after a trigger operation on first multimedia of the first UI is detected, a second resource list is determined according to a resource type of the first multimedia, the first UI is switched to a second UI, and resource content of the first multimedia is played in the second UI. Switching of the UI may be triggered through a trigger operation of the user on the first multimedia, thereby enriching the UI display effects; and the resource type of the first multimedia is used for analyzing the interests and/or hobbies of the user, and the second resource list of the second UI is determined accordingly, so that the multimedia in the second resource list may better meet the actual playing requirements of the user, thereby improving the flexibility and intelligence of the multimedia playing control, and improving the product competitiveness and user stickiness.

Figure 8:
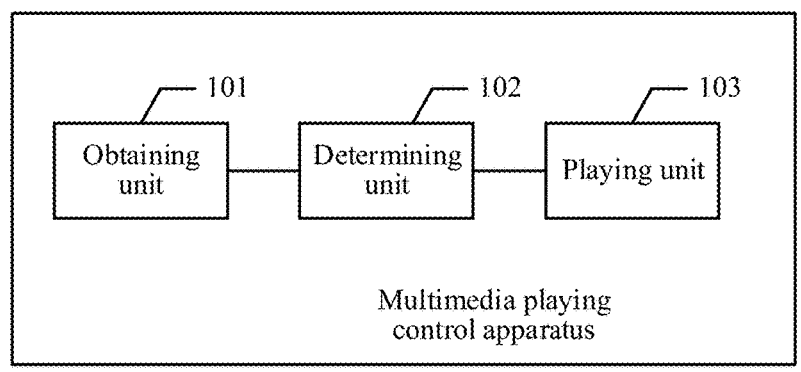
FIG. 8 is a schematic structural diagram of a multimedia playing control apparatus according to an embodiment of the disclosure.

Based on the foregoing embodiments of the multimedia playing control method, an embodiment of the disclosure provides a multimedia playing control apparatus. The multimedia playing control apparatus may be a computer program (including program code) run in a terminal, for example, may be a multimedia APP run on the terminal, and the multimedia APP may include, but is not limited to: a video client, a music client, a news client, a read client, and another client having a multimedia playing function. The multimedia APP may implement the foregoing multimedia playing control method, and may further implement a flexible presentation of UI styles in the backend, and UI elements are added, deleted and reordered without front-end modification to improve view reusability and reduce code duplication and maintenance costs, thereby reducing the release of client version updates, which is more flexible. The multimedia playing control apparatus may perform the method shown in FIG. 2 or FIG. 5. Referring to FIG. 8, the multimedia playing control apparatus may run the following units:

an obtaining unit 101, configured to obtain a first resource list of a first UI displayed currently, the first resource list including one or more pieces of multimedia;

the obtaining unit 101 being further configured to obtain, in a case that a trigger operation on first multimedia in the first UI is detected, a resource type of the first multimedia;

a determining unit 102, configured to determine a second resource list of a second UI according to the resource type of the first multimedia, the second resource list including at least the first multimedia; and a playing unit 103, configured to display the second UI based on the second resource list, and play resource content of the first multimedia in the second UI.

In an implementation, when determining a second resource list of a second UI according to the resource type of the first multimedia, the determining unit 102 may be configured to:

obtain second multimedia whose resource type belongs to the same type as the resource type of the first multimedia from the first resource list, and add the first multimedia and the second multimedia to the second resource list; or obtain third multimedia to be recommended according to the resource type of the first multimedia, and add the first multimedia and the third multimedia to the second resource list.

In an implementation, before displaying the second UI based on the second resource list, the playing unit 103 may be further configured to:

perform a first transition animation; and trigger, after the first transition animation has been played, an operation of displaying the second UI based on the second resource list.

In another implementation, when performing the first transition animation, the playing unit 103 may be configured to:

obtain a first transition control parameter corresponding to the first UI; and play the first transition animation according to the first transition control parameter.

In another implementation, the resource type includes an audio or a video. Correspondingly, when playing the resource content of the first multimedia in the second UI, the playing unit 103 may be configured to:

determine whether the first multimedia is played in the first UI;

obtain, in a case that the first multimedia is played in the first UI, first playing duration of the first multimedia in the first UI; and continue to play the resource content of the first multimedia in the second UI according to the first playing duration.

In another implementation, after determining a second resource list of a second UI according to the resource type of the first multimedia, the playing unit 103 may be configured to:

plan a layout of the second UI according to the second resource list, to obtain layout information of the second UI; and store the layout information of the second UI.

In another implementation, when displaying the second UI based on the second resource list, the playing unit 103 may be configured to:

obtain the layout information of the second UI; and display the second UI according to the layout information of the second UI.

In another implementation, the playing unit 103 may be further configured to:

control, in a case that a browse operation for the second UI is detected, displaying of the second UI according to the browse operation during playing of the resource content of the first multimedia in the second UI; and stop, in a case that a trigger operation on fourth multimedia in the second UI is detected, a playing process of the first multimedia in the second UI, and play the fourth multimedia in the second UI.

In another implementation, the playing unit 103 may be further configured to:

obtain, in a case that a return operation used for instructing to return from the second UI to the first UI is detected, playing duration of a target multimedia played currently in the second UI;

determine, whether the first UI includes the target multimedia; and set, in a case that the first UI includes the target multimedia, a positioning mark for the target multimedia in the first UI, and continue to play resource content of the target multimedia in the first UI according to the playing duration of the target multimedia.

In another implementation, before continuing to play resource content of the target multimedia in the first UI according to the playing duration of the target multimedia, the playing unit 103 may be further configured to:

perform a second transition animation; and display the first UI after the second transition animation has been played.

In another implementation, when performing the second transition animation, the playing unit 103 may be configured to:

obtain a second transition control parameter corresponding to the second UI; and play the second transition animation according to the second transition control parameter.

In another implementation, the playing unit 103 may be further configured to:

set, in a case that the first UI does not include the target multimedia, a positioning mark for the first multimedia in the first UI, and play the resource content of the first multimedia in the first UI.

According to an embodiment of the disclosure, the operations in the method shown in FIG. 2 or FIG. 5 may be performed by the units in the multimedia playing control apparatus shown in FIG. 8. For example, in FIG. 2, operations S201 and S202 may be performed by the obtaining unit 101 shown in FIG. 8, operation S203 is performed by the determining unit 102 shown in FIG. 8, and S204 and operation S205 may be performed by the playing unit 103 shown in FIG. 8. In another example, in FIG. 5, operations S501 and S502 may be performed by the obtaining unit 101 shown in FIG. 8, operation S503 may be performed by the determining unit 102 shown in FIG. 8, and operations S504 to S512 may be performed by the playing unit 103 shown in FIG. 8.

According to another embodiment of the disclosure, a part or all of the units of the multimedia playing control apparatus shown in FIG. 8 may be combined into one or several other units, or one (or more) of the units may be divided into multiple units of smaller functions. In this way, same operations may be implemented without affecting implementation of the technical effects of the embodiments of the disclosure. The foregoing units are divided based on logical functions. During an actual application, a function of one unit may be implemented by a plurality of units, or functions of a plurality of units are implemented by one unit. In other embodiments of the disclosure, the multimedia playing control apparatus may also include other units. In an actual application, the functions may also be cooperatively implemented by other unit and may be cooperatively implemented by multiple units.

According to another embodiment of the disclosure, a computer program (including program code) that may perform the operations in the corresponding method shown in FIG. 2 or FIG. 5 may run on a general computing device, such as a computer, which include processing elements and storage elements such as a central processing unit (CPU), a random access memory (RAM), and a read-only memory (ROM), to construct the multimedia playing control apparatus device shown in FIG. 8, and implement the multimedia playing control method in the embodiments of the disclosure. The computer program may be recorded in, for example, a computer readable recording medium, and may be loaded into the foregoing computing device by using the computer readable recording medium, and run on the computing device.

The embodiments of the disclosure may control playing of multimedia such as an audio and a video, and provide diversified UIs. In a process of the multimedia playing control, a first resource list of a first UI may be obtained first, after a trigger operation on first multimedia of the first UI is detected, a second resource list is determined according to a resource type of the first multimedia, the first UI is switched to a second UI, and resource content of the first multimedia is played in the second UI. Switching of the UI may be triggered through a trigger operation of the user on the first multimedia, thereby enriching the UI display effects; and the resource type of the first multimedia is used for analyzing the interests and/or hobbies of the user, and the second resource list of the second UI is determined accordingly, so that the multimedia in the second resource list may better meet the actual playing requirements of the user, thereby improving the flexibility and intelligence of the multimedia playing control, and improving the product competitiveness and user stickiness.

Figure 9:
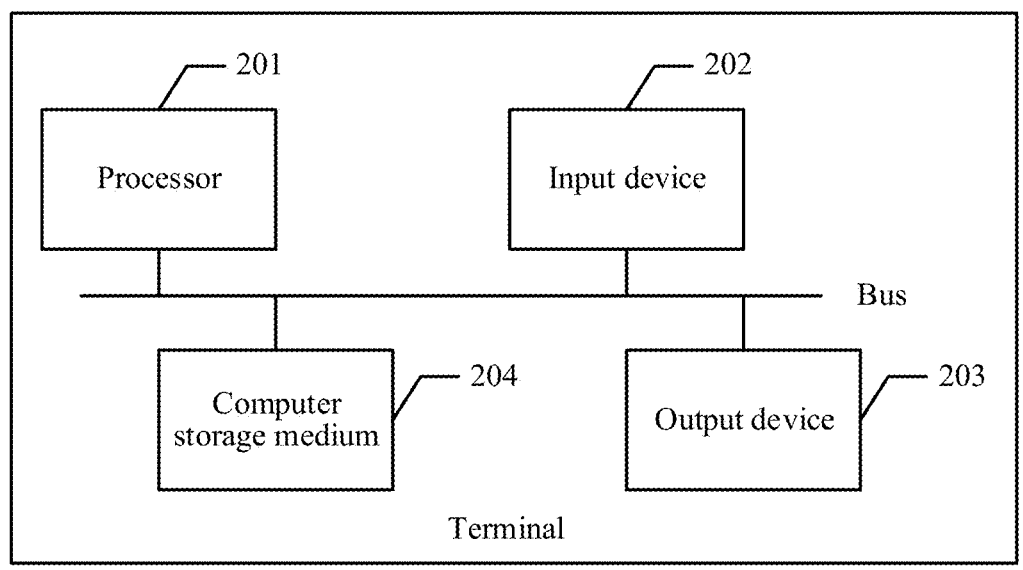
FIG. 9 is a schematic structural diagram of a terminal according to an embodiment of the disclosure.

Based on the descriptions of the foregoing method embodiments and apparatus embodiment, an embodiment of the disclosure further provides a terminal. The terminal may be applied to the multimedia playing control. The terminal may run a multimedia APP. Referring to FIG. 9, an internal structure of the terminal includes at least a processor 201, an input device 202, an output device 203, and a computer storage medium 204. The processor 201, the input device 202, the output device 203, and the computer storage medium 204 in the terminal may be connected by using a bus or in another manner. In FIG. 9 shown in this embodiment of the disclosure, a connection by using a bus is used as an example. The input device 202 may further include, for example, a physical and/or virtual keyboard, a functional key (such as a volume control key or a switch key), a track ball, a mouse, a joystick, a voice command input unit or microphone, a touch screen display, a touch-sensitive input pad, a gesture capture camera, or other input buttons or controls. The output device 203 may include, for example, a display device, a speaker, or the like. The input device 202 may provide a user interface to receive a user input and the output device 203 may provide playing of the multimedia.

The computer storage medium 204 is configured to store a computer program. The computer program includes a program instruction. The processor 201 is configured to execute the program instruction stored in the computer storage medium 304. The processor 201 (or referred to as a central processing unit (CPU)) is a compute core and a control core of the terminal, which is suitable for implementing one or more instructions, and is specifically suitable to load and execute one or more instructions to implement corresponding method procedures or corresponding functions. In an embodiment, the processor 201 according to this embodiment of the disclosure may be configured to perform a series of playing control processing according to the obtained first resource list, including: obtaining a first resource list of a first UI displayed currently, the first resource list including one or more pieces of multimedia; obtaining, in a case that a trigger operation on first multimedia in the first UI is detected, a resource type of the first multimedia; determining a second resource list of a second UI according to the resource type of the first multimedia, the second resource list including at least the first multimedia; and displaying the second UI based on the second resource list, and playing resource content of the first multimedia in the second UI, and the like.

The computer storage medium (memory) 204 is configured to store a computer program. The computer program includes a program instruction. The processor 201 is configured to execute the program instruction stored in the computer storage medium. The computer storage medium is a memory device in the terminal and is configured to store programs and data. It may be understood that, the computer storage medium herein may include an internal storage medium in the terminal and may also include an expanded storage medium supported by the terminal. The computer storage medium provides a storage space, the storage space storing an operating system of the terminal. In addition, the storage space further stores one or more instructions suitable to be loaded and executed by a processor, and the instructions may be one or more computer programs (including the program code). The computer storage medium herein may be a high speed random access memory (RAM) or a nonvolatile memory, for example, at least one magnetic disk memory. Optionally, the computer storage medium may further be at least one computer storage medium located away from the foregoing processor.

In an implementation, the processor 201 may load and execute one or more second instructions stored in the computer storage medium, to implement corresponding operations of the method shown in FIG. 2 or FIG. 5. During specific implementation, the one or more instructions in the computer storage medium may be loaded by the processor 201 to perform the following operations:

obtaining a first resource list of a first UI displayed currently, the first resource list including one or more pieces of multimedia;

obtaining, in a case that a trigger operation on first multimedia in the first UI is detected, a resource type of the first multimedia;

determining a second resource list of a second UI according to the resource type of the first multimedia, the second resource list including at least the first multimedia; and displaying the second UI based on the second resource list, and playing resource content of the first multimedia in the second UI.

In an implementation, when determining a second resource list of a second UI according to the resource type of the first multimedia, the one or more instructions may be loaded by the processor 201 to specifically perform the following operations:

obtaining second multimedia whose resource type belongs to the same type as the resource type of the first multimedia from the first resource list, and adding the first multimedia and the second multimedia to the second resource list; or obtaining third multimedia to be recommended according to the resource type of the first multimedia, and adding the first multimedia and the third multimedia to the second resource list.

In another implementation, before displaying the second UI based on the second resource list, the one or more instructions may be loaded by the processor 201 to specifically perform the following operations:

performing a first transition animation; and triggering, after the first transition animation has been played, an operation of displaying the second UI based on the second resource list.

In another implementation, when performing the first transition animation, the one or more instructions may be loaded by the processor 201 to specifically perform the following operations:

obtaining a first transition control parameter corresponding to the first UI; and playing the first transition animation according to the first transition control parameter.

In another implementation, the resource type includes an audio or a video. Correspondingly, when playing the resource content of the first multimedia in the second UI, the one or more instructions may be loaded by the processor 201 to specifically perform the following operations:

determining whether the first multimedia is played in the first UI;

obtaining, in a case that the first multimedia is played in the first UI, first playing duration of the first multimedia in the first UI; and continuing to play the resource content of the first multimedia in the second UI according to the first playing duration.

In another implementation, after determining a second resource list of a second UI according to the resource type of the first multimedia, the one or more instructions may be loaded by the processor 201 to specifically perform the following operations:

planning a layout of the second UI according to the second resource list, to obtain layout information of the second UI; and storing the layout information of the second UI.

In another implementation, when displaying the second UI based on the second resource list, the one or more instructions may be loaded by the processor 201 to specifically perform the following operations:

obtaining the layout information of the second UI; and displaying the second UI according to the layout information of the second UI.

In another implementation, the one or more instructions may be loaded by the processor 201 to specifically perform the following operations:

controlling, in a case that a browse operation on the second UI is detected, displaying of the second UI according to the browse operation during playing of the resource content of the first multimedia in the second UI; and stopping, in a case that a trigger operation on fourth multimedia in the second UI is detected, a playing process of the first multimedia in the second UI, and playing the fourth multimedia in the second UI.

In another implementation, the one or more instructions may be loaded by the processor 201 to specifically perform the following operations:

obtaining, in a case that a return operation used for instructing to return from the second UI to the first UI is detected, playing duration of a target multimedia played currently in the second UI;

determining, whether the first UI includes the target multimedia; and setting, in a case that the first UI includes the target multimedia, a positioning mark for the target multimedia in the first UI, and continuing to play resource content of the target multimedia in the first UI according to the playing duration of the target multimedia.

In another implementation, before continuing to play resource content of the target multimedia in the first UI according to the playing duration of the target multimedia, the one or more instructions may be loaded by the processor 201 to specifically perform the following operations:

performing a second transition animation; and displaying the first UI after the second transition animation has been played.

In another implementation, when performing the second transition animation, the one or more instructions may be loaded by the processor 201 to specifically perform the following operations:

obtaining a second transition control parameter corresponding to the second UI; and playing the second transition animation according to the second transition control parameter.

In another implementation, the one or more instructions may be loaded by the processor 201 to specifically perform the following operations:

setting, in a case that the first UI does not include the target multimedia, a positioning mark for the first multimedia in the first UI, and playing the resource content of the first multimedia in the first UI.

The embodiments of the disclosure may control playing of multimedia such as audio and a video, and provide diversified UIs. In a process of the multimedia playing control, a first resource list of a first UI may be obtained first, after a trigger operation on first multimedia of the first UI is detected, a second resource list is determined according to a resource type of the first multimedia, the first UI is switched to a second UI, and resource content of the first multimedia is played in the second UI. Switching of the UI may be triggered through a trigger operation of the user on the first multimedia, thereby enriching the UI display effects; and the resource type of the first multimedia is used for analyzing the interests and/or hobbies of the user, and the second resource list of the second UI is determined accordingly, so that the multimedia in the second resource list may better meet the actual playing requirements of the user, thereby improving the flexibility and intelligence of the multimedia playing control, and improving the product competitiveness and user stickiness.

An embodiment of the disclosure further provides a computer program product including an instruction, when being run on a server, the computer program product enabling the server to perform the data processing method according to the foregoing embodiments.

The embodiments in the specification are all described in a progressive manner. For same or similar parts in the embodiments, refer to these embodiments, and each embodiment focuses on a difference from other embodiments. The apparatus disclosed in the embodiments are corresponding to the method disclosed in the embodiments and therefore is only briefly described, and reference may be made to the descriptions of the method for the associated part.

A person skilled in the art may further realize that the units and algorithm operations of the examples described with reference to the embodiments disclosed in this specification may be implemented by electronic hardware, computer software, or a combination thereof. To clearly describe the interchangeability of the hardware and software, the parts and operations of each example are described generally according to the functions in the foregoing description. Whether the functions are executed in the manner of hardware or software depends on specific applications and design constraints of the technical solutions. A person skilled in the art may use different methods to implement the described functions for each particular application, but it is not to be considered that the implementation goes beyond the scope of the disclosure.

In combination with the embodiments herein, operations of the method or algorithm described may be directly implemented using hardware, a software module executed by a processor, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the art.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing description of the disclosed embodiments enables a person skilled in the art to implement or use the disclosure. Various modifications to the embodiments are obvious to the person skilled in the art, and general principles defined in this specification may be implemented in other embodiments without departing from the spirit or scope of the disclosure. Therefore, the disclosure is not limited to these embodiments illustrated in the present disclosure, but needs to conform to the broadest scope consistent with the principles and novel features disclosed in the present disclosure.

What is claimed is:

1. A method of controlling playing of multimedia, performed by a terminal including at least one processor and at least one memory, the method comprising:
   obtaining, by the terminal, a first resource list of a first user interface (UI), the first resource list comprising one or more pieces of multimedia;
   performing, by the terminal based on detection of a trigger operation on first multimedia in the first UI:
      obtaining a resource type of the first multimedia, and determining a second resource list of a second UI, the second resource list comprising at least the first multimedia and a plurality of pieces of second multimedia, the plurality of pieces of second multimedia being determined based on the resource type of the first multimedia; and
      switching the first UI to the second UI based on the second resource list, playing resource content of the first multimedia in the second UI, and displaying, on an entire area of a display screen of the terminal, a first screen corresponding to the playing of the resource content of the first multimedia, the first screen not including the plurality of pieces of second multimedia;
   based on detection, by the terminal, of a browse operation on the first screen while the first screen is being displayed on the entire area of the display screen and the resource content of the first multimedia in the second UI is being played, switching, on the entire area of the display screen, the first screen to a second screen, the second screen occupying the entire area of the display screen and corresponding to a single piece of second multimedia, among the plurality of pieces of second multimedia, wherein the resource content of the first multimedia is continuously played after the first screen is switched to the second screen; and
   stopping, by the terminal based on detection of a trigger operation, which is received subsequently to the browsing operation, on the second screen, the playing of the resource content of the first multimedia in the second UI, and playing resource content of the single piece of second multimedia in the second UI.

2. The method according to claim 1, further comprising, prior to the switching:
   performing, by the terminal, a first transition animation;
   triggering, by the terminal after the first transition animation has been played, an operation of displaying the second UI based on the second resource list.

3. The method according to claim 2, wherein the performing comprises:
   obtaining, by the terminal, a first transition control parameter corresponding to the first UI; and
   playing, by the terminal, the first transition animation based on the first transition control parameter.

4. The method according to claim 1, wherein the resource type comprises at least one of an audio, an image, or a video, and
   wherein the playing the resource content of the first multimedia in the second UI comprises:
      obtaining, by the terminal based on the first multimedia being played in the first UI, a playing duration of the first multimedia in the first UI; and
      playing, by the terminal, the resource content of the first multimedia in the second UI based on the playing duration.

5. The method according to claim 4, further comprising:
   planning, by the terminal, a layout of the second UI based on the second resource list, to obtain layout information of the second UI; and
   storing, by the terminal, the layout information of the second UI.

6. The method according to claim 5, wherein the switching comprises:
   obtaining, by the terminal, the layout information of the second UI; and
   displaying, by the terminal, the second UI based on the layout information of the second UI.

7. The method according to claim 1, further comprising:
   obtaining, by the terminal based on detection of an instruction to return from the second UI to the first UI, a playing duration of a target multimedia currently played in the second UI;
   determining, by the terminal, whether the first UI comprises the target multimedia; and
   setting, by the terminal based on the first UI comprising the target multimedia, a positioning mark for the target multimedia in the first UI, and playing resource content of the target multimedia in the first UI based on the playing duration of the target multimedia.

8. The method according to claim 7, further comprising, prior to the playing the resource content of the target multimedia in the first UI:
   performing, by the terminal, a second transition animation; and
   displaying, by the terminal, the first UI after the second transition animation has been played.

9. The method according to claim 8, wherein the performing the second transition animation comprises:
   obtaining, by the terminal, a second transition control parameter corresponding to the second UI; and
   playing, by the terminal, the second transition animation based on the second transition control parameter.

10. The method according to claim 7, further comprising:
    setting, by the terminal based on the first UI not comprising the target multimedia, a positioning mark for the first multimedia in the first UI, and playing the resource content of the first multimedia in the first UI.

11. A terminal for controlling playing of multimedia, the terminal comprising an input interface configured to receive a user input and an output interface to output the multimedia, further comprising:
    a computer readable storage medium, storing one or more instructions; and
    at least one processor configured to execute the one or more instructions to perform the method according to claim 1.

12. The method according to claim 1, wherein the plurality of pieces of second multimedia are respectively assigned with sequence orders, and
    wherein the switching the first screen to the second screen comprises:
       based on detection, by the terminal, of the browse operation in a first direction on the first screen the resource content of the first multimedia in the second UI, switching the first screen to the second screen in which a piece of second multimedia that is assigned with a highest sequence order is browsed.

13. The method according to claim 12, wherein the switching the first screen to the second screen further comprises:
    based on another detection, by the terminal, of the browse operation in the first direction on the second screen the resource content of the first multimedia in the second UI, switching the second screen to a third screen in which a piece of second multimedia that is assigned with a second highest sequence order is browsed, wherein the resource content of the first multimedia is continuously played after the second screen is switched to the third screen.

14. The method according to claim 12, wherein the switching the first screen to the second screen further comprises:
based on detection, by the terminal, of the browse operation in a second direction, opposite to the first direction, on the first screen the resource content of the first multimedia in the second UI, switching the first screen to a fourth screen in which a piece of second multimedia that is assigned with a lowest sequence order is browsed, wherein the resource content of the first multimedia is continuously played after the first screen is switched to the fourth screen.

15. The method according to claim 1, further comprising:
managing, by the terminal, a player cache pool including at least two players such that, at any time, only one player is allowed to play in a multimedia application running on the terminal, each of the at least two players being associated with a corresponding piece of multimedia of the one or more pieces of multimedia to be used to play a resource content of the corresponding piece of multimedia, and
wherein the stopping the playing of the resource content of the first multimedia and the playing the resource content of the single piece of second multimedia comprises:
switching a current player used to play the resource content of the first multimedia in an idle state, and selecting, from the player cache pool, a new player to play the resource content of the single piece of second multimedia in the second UI.

16. An apparatus for controlling playing of multimedia, the apparatus comprising:
at least one memory configured to store program code; and
at least one processor configured to read the program code and operate as instructed by the program code, the program code comprising:
first obtaining code configured to cause at least one of the at least one processor to obtain a first resource list of a first user interface (UI) currently displayed on a terminal, the first resource list comprising one or more pieces of multimedia;
second obtaining code configured to cause at least one of the at least one processor to obtain, based on detection of a trigger operation on first multimedia in the first UI, a resource type of the first multimedia;
first determining code configured to cause at least one of the at least one processor to determine a second resource list of a second UI, the second resource list comprising at least the first multimedia and a plurality of pieces of second multimedia, the plurality of pieces of second multimedia being determined based on the resource type of the first multimedia;
playing code configured to cause at least one of the at least one processor to switch from the first UI to the second UI based on the second resource list, play resource content of the first multimedia in the second UI, and display a first screen, on an entire area of a display screen of the terminal, corresponding to the playing of the resource content of the first multimedia, the first screen not including the plurality of pieces of second multimedia;
browsing code configured to cause at least one of the at least one processor to, based on detection of a browse operation on the first screen while the first screen is being displayed on the entire area of the display screen and the resource content of the first multimedia in the second UI is being played, switch, on the entire area of the display screen, the first screen to a second screen, the second screen occupying the entire area of the display screen and corresponding to a single piece of second multimedia, among the plurality of pieces of second multimedia, wherein the resource content of the first multimedia is continuously played after the first screen is switched to the second screen; and
stopping code configured to cause at least one of the at least one processor to, based on detection of a trigger operation, which is received subsequently to the browsing operation, on the second screen, stop the playing of the resource content of the first multimedia in the second UI, and play resource content of the single piece of second multimedia in the second UI.

17. The apparatus according to claim 16, wherein the program code further comprises:
performing code configured to cause at least one of the at least one processor to perform a first transition animation; and
triggering code configured to cause at least one of the at least one processor to trigger, after the first transition animation has been played, an operation of displaying the second UI based on the second resource list.

18. The apparatus according to claim 16, wherein the resource type comprises at least one of an audio, an image, or a video, and
wherein the playing code causes at least one of the at least one processor to obtain, based on the first multimedia being played in the first UI, a playing duration of the first multimedia in the first UI, and play the resource content of the first multimedia in the second UI based on the playing duration.

19. The apparatus according to claim 16, wherein the program code further comprises:
obtaining code configured to cause at least one of the at least one processor to obtain, based on detection of an instruction to return from the second UI to the first UI, a playing duration of a target multimedia currently played in the second UI;
second determining code configured to cause at least one of the at least one processor to determine whether the first UI comprises the target multimedia; and
setting code configured to cause at least one of the at least one processor to set, based on the first UI comprising the target multimedia, a positioning mark for the target multimedia in the first UI, and play resource content of the target multimedia in the first UI based on the playing duration of the target multimedia.

20. A non-transitory computer readable storage medium, storing one or more instructions, the one or more instructions being loaded and executed by a processor to perform:
obtaining a first resource list of a first user interface (UI), the first resource list comprising one or more pieces of multimedia;
obtaining based on detection of a trigger operation on first multimedia in the first UI, a resource type of the first multimedia;

determining a second resource list of a second UI, the second resource list comprising at least the first multimedia and a plurality of pieces of second multimedia, the plurality of pieces of second multimedia being determined based on the resource type of the first multimedia;

switching the first UI to the second UI based on the second resource list, playing resource content of the first multimedia in the second UI, and displaying a first screen, on an entire area of a display screen of the terminal, corresponding to the playing of the resource content of the first multimedia, the first screen not including the plurality of pieces of second multimedia;

based on detection of a browse operation on the first screen while the first screen is being displayed on the entire area of the display screen and the resource content of the first multimedia in the second UI is being played, switching, on the entire area of the display screen, the first screen to a second screen, the second screen occupying the entire area of the display screen and corresponding to a single piece of second multimedia, among the plurality of pieces of second multimedia, wherein the resource content of the first multimedia is continuously played after the first screen is switched to the second screen; and stopping, based on detection of a trigger operation, which is received subsequently to the browsing operation, on the second screen, the playing of the resource content of the first multimedia in the second UI, and playing resource content of the single piece of second multimedia in the second UI.

* * * * *